United States Patent
Saha et al.

(10) Patent No.: US 11,258,391 B2
(45) Date of Patent: Feb. 22, 2022

(54) ROTATING ELECTRICAL MACHINE CONTROL DEVICE

(71) Applicant: AISIN AW CO., LTD., Anjo (JP)

(72) Inventors: Subrata Saha, Anjo (JP); Isao Fujiwara, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/769,466

(22) PCT Filed: Jan. 17, 2019

(86) PCT No.: PCT/JP2019/001339
§ 371 (c)(1),
(2) Date: Jun. 3, 2020

(87) PCT Pub. No.: WO2019/142877
PCT Pub. Date: Jul. 25, 2019

(65) Prior Publication Data
US 2020/0389115 A1 Dec. 10, 2020

(30) Foreign Application Priority Data
Jan. 18, 2018 (JP) ............................. JP2018-006439

(51) Int. Cl.
*H02P 6/14* (2016.01)
*H02P 25/22* (2006.01)
*H02P 27/08* (2006.01)

(52) U.S. Cl.
CPC ............ *H02P 25/22* (2013.01); *H02P 27/085* (2013.01)

(58) Field of Classification Search
CPC .......... H02M 7/48; H02P 25/22; H02P 27/08; H02P 27/085
See application file for complete search history.

(56) References Cited

U.S. PATENT DOCUMENTS

| | | | |
|---|---|---|---|
| 2011/0074326 A1* | 3/2011 | Su | H02P 6/17 318/400.27 |
| 2011/0266992 A1* | 11/2011 | Nishiguchi | H02P 27/08 318/807 |

(Continued)

FOREIGN PATENT DOCUMENTS

| | | |
|---|---|---|
| JP | 2014-171362 A | 9/2014 |
| JP | 2014-192950 A | 10/2014 |

(Continued)

OTHER PUBLICATIONS

Grandi et al. "Synchronized PWM Control of Asymmetrical Dual-Inverter Fed Open-End Winding Traction Drive", Electrical Systems for Aircraft, Railway and Ship Propulsion (ESARS), 2012, IEEE (Oct. 16, 2012) pp. 1-8, XP032282811 (8 pages total).

(Continued)

*Primary Examiner* — Muhammad S Islam
(74) *Attorney, Agent, or Firm* — Sughrue Mion, PLLC

(57) ABSTRACT

Two inverters provided at both ends of each open-end winding, respectively, are appropriately controlled. A rotating electrical machine control device (1) that has at least two control schemes among pulse width modulation control, active short-circuit control, and rectangular-wave control, as control schemes for a first inverter (11) and a second inverter (12), and that can control the first inverter (11) and the second inverter (12) by control schemes which are independent of each other considers one of the plurality of control schemes as a first control scheme and one of the plurality of control schemes different than the first control scheme as a second control scheme, and has a control mode in which the first inverter (11) is controlled by the first control scheme and the second inverter (12) is controlled by the second control scheme.

19 Claims, 8 Drawing Sheets

(56) References Cited

U.S. PATENT DOCUMENTS

| | | | |
|---|---|---|---|
| 2015/0200613 A1* | 7/2015 | Ota | H02P 3/18 |
| | | | 318/376 |
| 2016/0043670 A1* | 2/2016 | Nakamura | H02P 29/032 |
| | | | 318/400.17 |
| 2016/0094163 A1* | 3/2016 | Takahashi | B60L 50/61 |
| | | | 318/400.06 |
| 2017/0294863 A1* | 10/2017 | Takahashi | H02P 21/22 |
| 2017/0331400 A1* | 11/2017 | Saha | H02P 6/12 |
| 2017/0361732 A1* | 12/2017 | Grubic | B60L 15/02 |

FOREIGN PATENT DOCUMENTS

| | | | |
|---|---|---|---|
| JP | 2015-073373 A | 4/2015 | |
| JP | 2016-092946 A | 5/2016 | |
| JP | 2016-123223 A | 7/2016 | |
| JP | 2017-005810 A | 1/2017 | |
| JP | 2019-047670 A | 3/2019 | |

OTHER PUBLICATIONS

Communication dated Dec. 8, 2020 from the European Patent Office in EP Application No. 19741882.5.
V. Oleschuk, et al., "Dual Inverter-Fed Traction Drive with DC Sources Power Balancing Based on Synchronized PWM", IEEE, Conference Paper, Jun. 2007, pp. 260-265.
International Search Report for PCT/JP2019/001339 dated Apr. 16, 2019 (PCT/ISA/210).

* cited by examiner

ROTATING ELECTRICAL MACHINE CONTROL DEVICE

CROSS REFERENCE TO RELATED APPLICATIONS

This application is a National Stage of International Application No. PCT/JP2019/001339 filed Jan. 17, 2019, claiming priority based on Japanese Patent Application No. 2018-006439 filed Jan. 18, 2018, the entire contents of which are incorporated herein by reference.

TECHNICAL FIELD

Aspects of the present disclosure relate to a rotating electrical machine control device that controls drive of a rotating electrical machine having open-end windings through two inverters.

BACKGROUND ART

The IEEE paper titled "Dual Inverter-Fed Traction Drive with DC Sources Power Balancing Based on Synchronized PWM" released in 2007 by V. Oleschuk et al. discloses a control device that controls drive of a three-phase alternating-current type rotating electrical machine by performing switching control on inverters provided at both ends of each three-phase open-end winding, respectively, which are included in the rotating electrical machine. Meanwhile, as a well-known mode, for example, there is also one in which drive of a rotating electrical machine is controlled by performing switching control on one inverter provided at an other-end side of each Y-winding to which a one-end side of each three-phase winding is connected. A system using open-end windings and two inverters can increase line-to-line voltage of alternating-current voltage of the windings compared to a system using Y-windings and a single inverter if direct-current voltage is the same, and can allow a rotating electrical machine to operate at higher output.

The introduction of the paper by V. Oleschuk et al. describes that by making the phases of carrier signals for generating pulses for performing switching control on the two inverters different from each other, the magnitude of ripple of current flowing through the windings can be reduced. V. Oleschuk et al. further mentions that by generating pulses by a synchronous scheme instead of an asynchronous scheme using a carrier signal, more suitable control can be performed for medium/high output applications, too. Note, however, that in both the asynchronous scheme and the synchronous scheme, switching control is performed on the two inverters by the same control scheme, for example, as shown in the following table 1.

TABLE 1

| mode | inv1 | inv2 |
|---|---|---|
| mode1 | CPWM [asynchronous] | CPWM [asynchronous] |
| mode2 | DPWM [asynchronous] | DPWM [asynchronous] |
| mode3 | DPWM [synchronous] | DPWM [synchronous] |
| mode4 | 1 Pulse [synchronous] | 1-Pulse [synchronous] |

Note that in table 1 "CPWM" indicates continuous pulse width modulation, "DPWM" indicates discontinuous PWM, "1-Pulse" indicates rectangular-wave modulation (1-Pulse Modulation), "asynchronous" indicates asynchronous modulation which is asynchronous with the rotation of the rotating electrical machine, and "synchronous" indicates synchronous modulation which is synchronized with the rotation of the rotating electrical machine. For example, in the continuous pulse width modulation, pulses are generated based on a magnitude relationship between the amplitude of an alternating-current waveform (e.g., an alternating-current voltage waveform) which is an output instruction and the amplitude of the waveform of a triangle wave (including sawtooth wave) carrier (also including a case in which a PWM waveform is directly generated by digital computation instead of a comparison with the carrier.). The carrier is determined based on, for example, a control cycle such as a computation cycle of a microcomputer or a duty cycle of an electronic circuit, and is not constrained by (not synchronized with) the rotational speed or rotational angle (electrical angle) of the rotating electrical machine. Such a modulation scheme is referred to as asynchronous modulation. On the other hand, in the rectangular-wave modulation, a single pulse is outputted per electrical angle cycle of the rotating electrical machine, and the pulse is synchronized with the rotational speed or rotational angle (electrical angle) of the rotating electrical machine. Hence, the rectangular-wave modulation is a synchronous modulation scheme. The discontinuous PWM can be implemented by either of the asynchronous scheme and the synchronous scheme.

However, switching control schemes for the inverters are not limited to those modulation schemes. It is desirable that a switching control scheme be determined based on various elements such as torque, rotational speed, and voltage on a direct-current side which are required for the rotating electrical machine, so that operation with higher system efficiency can be performed. Therefore, there is still room for improvement in appropriate control of two inverters provided at both ends of each open-end winding, respectively, with higher system efficiency.

CITATIONS LIST

Patent Literature

Non-Patent Literature 1: V. Oleschuk, R. Bojoi, G. Griva, F. Profumo, "Dual Inverter-Fed Traction Drive with DC Sources Power Balancing Based on Synchronized PWM", Conference Paper/June 2007, 1-4244-0743-5/07, IEEE, p. 260-265.

SUMMARY OF THE DISCLOSURE

Technical Problems

In view of the above-described background, it is desired to provide a technique for appropriately controlling two inverters provided at both ends of each open-end winding, respectively.

Solutions to Problems

In a rotating electrical machine control device that considers the above description and that controls drive of a rotating electrical machine having multiphase open-end windings through a first inverter and a second inverter, the multiphase open-end windings being independent of each other, the first inverter is connected to a one-end side of each of the multiphase open-end windings to convert electric power between direct current and multiphase alternating current, the second inverter is connected to an other-end side of each of the multiphase open-end windings to convert electric power between direct current and multiphase alternating current, in the first inverter and the second inverter, an arm for each alternating-current phase includes a series circuit of an upper-stage-side switching element and a lower-stage-side switching element, the rotating electrical machine control device has, as control schemes for the first inverter and the second inverter, at least two control schemes among pulse width modulation control that outputs a plurality of pulses with different patterns in a single electrical angle cycle, active short-circuit control that brings the upper-stage-side switching elements of the arms for all of a plurality of phases into an on state or brings the lower-stage-side switching elements of the arms for all of a plurality of phases into an on state, and rectangular-wave control that outputs a single pulse in a single electrical angle cycle, the first inverter and the second inverter can be controlled by the control schemes that are independent of each other, one of the plurality of control schemes is a first control scheme and one of the plurality of control schemes different than the first control scheme is a second control scheme, and the rotating electrical machine control device has a control mode in which the first inverter is controlled by the first control scheme and the second inverter is controlled by the second control scheme.

For control schemes for controlling the inverters, there are known various schemes appropriate to operating conditions such as the rotational speed and torque of the rotating electrical machine. When, as in the present configuration, two inverters are provided, alternating-current voltage whose amplitude is larger than that of voltage on a direct-current side can be generated. Note, however, that the rotating electrical machine control device does not need to control the two inverters so as to always obtain the largest amplitude of alternating current, and may control the two inverters so as to obtain as-needed amplitude. By controlling the first inverter and the second inverter by control schemes which are independent of each other, the two inverters can be flexibly controlled based on the operating conditions of the rotating electrical machine. Furthermore, by having a control mode in which the first inverter and the second inverter are controlled by different control schemes, flexibility in control is increased, enabling to control drive of the rotating electrical machine with high efficiency based on the operating conditions of the rotating electrical machine. Namely, according to the present configuration, the two inverters provided at both ends of each open-end winding, respectively, can be appropriately controlled.

Further features and advantages of the rotating electrical machine control device will become apparent from the following description of an embodiment which will be described with reference to drawings.

DESCRIPTION OF EMBODIMENTS

Figure 1:
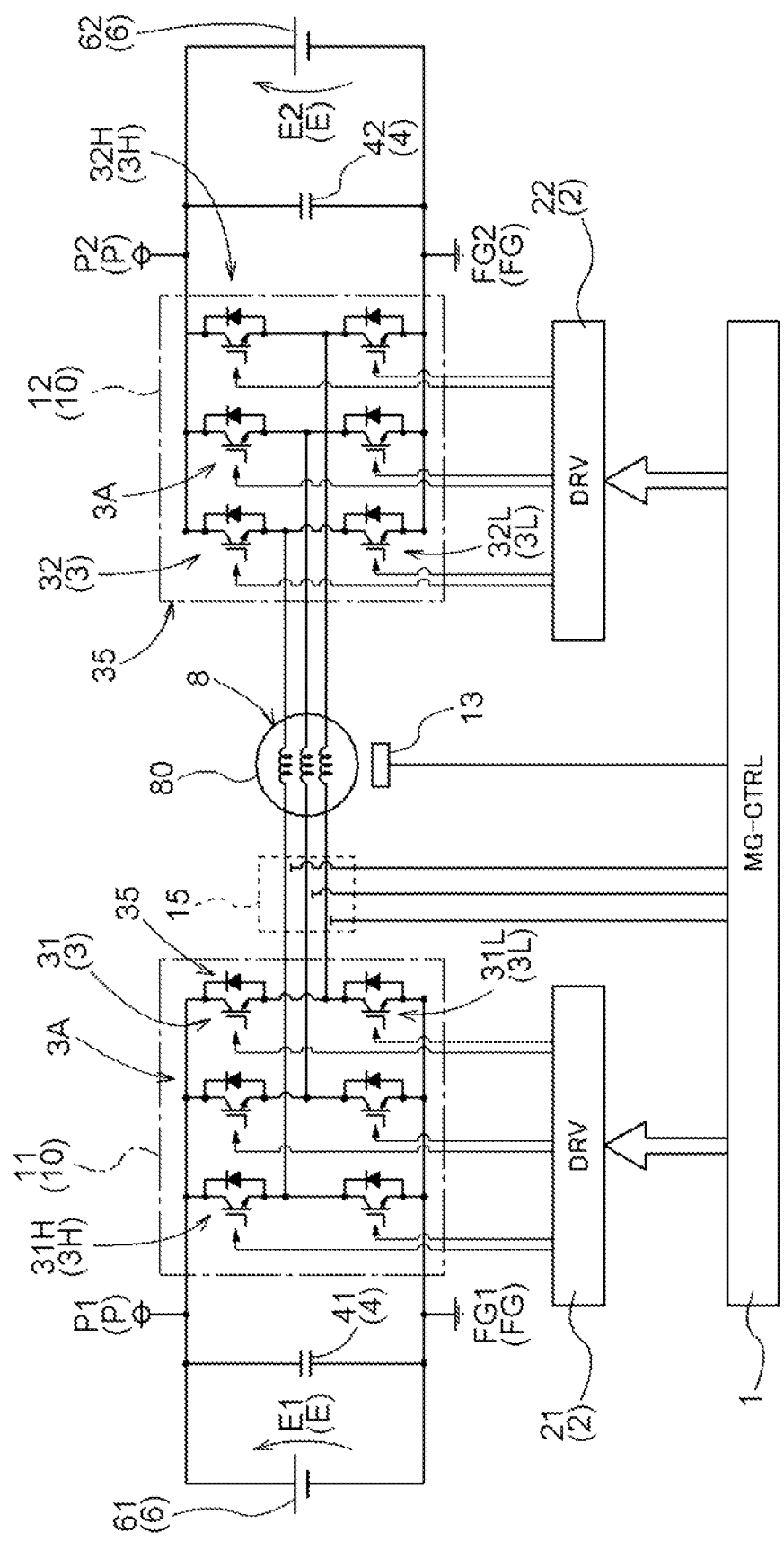
FIG. 1 is a schematic block diagram of a rotating electrical machine drive system.

An embodiment of a rotating electrical machine control device that controls, through two inverters, drive of a rotating electrical machine having multiphase open-end windings which are independent of each other will be described below based on the drawings. FIG. 1 is a schematic block diagram of a rotating electrical machine drive system including a rotating electrical machine control device 1 (MG-CTRL). A rotating electrical machine 80 serves as, for example, a drive power source for wheels of a vehicle such as an electric vehicle or a hybrid vehicle. The rotating electrical machine 80 is an open-end winding type rotating electrical machine having multiphase (three phases in the present embodiment) stator coils 8 (open-end windings) which are independent of each other. Inverters 10 that are controlled independently of each other to convert electric power between direct current and multiphase (here, three phases) alternating current are connected to both ends of each stator coil 8, respectively. That is, a first inverter 11 (INV1) is connected to a one-end side of each stator coil 8, and a second inverter 12 (INV2) is connected to an other-end side of each stator coil 8. In the following, when the first inverter 11 and the second inverter 12 do not need to be distinguished from each other, they are described, simply referred to as inverters 10.

The inverters 10 each are constructed to include a plurality of switching elements 3. For the switching elements 3, insulated gate bipolar transistors (IGBTs) or power metal oxide semiconductor field effect transistors (MOSFETs) are used. FIG. 1 exemplifies a mode of using IGBTs as the switching elements 3. The first inverter 11 and the second inverter 12 have the same circuit connection mode, but may be constructed using switching elements 3 of the same type or may be constructed using switching elements 3 of different types. Though details will be described later, it is preferred to use switching elements whose switching loss upon a transition between an off state and an on state is relatively small compared to Si-IGBTs or Si-MOSFETs, e.g., first switching elements 31 included in the first inverter 11 are Si-IGBTs or Si-MOSFETs, and second switching elements 32 included in the second inverter 12 are silicon carbide-metal oxide semiconductor FETs (SiC-MOSFETs), SiC-static induction transistors (SiC-SITs), gallium nitride-MOSFETs (GaN-MOSFETs), etc.

In the two inverters 10, an arm 3A for each alternating-current phase includes a series circuit of an upper-stage-side switching element 3H and a lower-stage-side switching element 3L. Each switching element 3 includes a freewheeling diode 35 in parallel thereto, with a direction going from a negative polarity FG to a positive polarity P (a direction going from a lower-stage side to an upper-stage side) being a forward direction. In addition, in the present embodiment, the two inverters 10 are connected to direct-current power supplies 6 which are independent of each other. That is, a first floating ground FG1 which is the negative polarity FG of the first inverter 11 and a second floating ground FG2 which is the negative polarity FG of the second inverter 12 are independent of each other. In addition, direct-current link capacitors 4 (smoothing capacitors) that smooth direct-current voltage are provided between the inverters 10 and the direct-current power supplies 6.

Specifically, the first inverter 11 in which an arm 3A for a single alternating-current phase includes a series circuit of a first upper-stage-side switching element 31H and a first lower-stage-side switching element 31L has a first direct-current link capacitor 41 (first smoothing capacitor) connected on a direct-current side thereof, and is connected to a first direct-current power supply 61 on the direct-current side thereof and connected to a one-end side of each multiphase stator coil 8 on an alternating-current side thereof, and thereby converts electric power between direct current and multiphase alternating current. The second inverter 12 in which an arm 3A for a single alternating-current phase includes a series circuit of a second upper-stage-side switching element 32H and a second lower-stage-side switching element 32L has a second direct-current link capacitor 42 (second smoothing capacitor) connected on a direct-current side thereof, and is connected to a second direct-current power supply 62 on the direct-current side thereof and connected to an other-end side of each multiphase stator coil 8 on an alternating-current side thereof, and thereby converts electric power between direct current and multiphase alternating current.

In the present embodiment, the first direct-current power supply 61 and the second direct-current power supply 62 are direct-current power supplies having equal ratings of voltage, etc., and likewise, the first direct-current link capacitor 41 and the second direct-current link capacitor are capacitors having equal ratings of capacitance, etc. The rated voltage of the direct-current power supplies 6 is on the order of 48 volts to 400 volts. The direct-current power supplies 6 are constructed using, for example, a secondary battery (battery) such as a nickel-hydrogen battery or a lithium-ion battery, or electric double-layer capacitor. The rotating electrical machine 80 can function as both an electric motor and a generator. The rotating electrical machine 80 converts electric power from the direct-current power supplies 6 into mechanical power through the inverters 10 (motoring). Alternatively, the rotating electrical machine 80 converts rotary drive power transmitted from the wheels, etc., into electric power and charges the direct-current power supplies 6 through the inverters 10 (regeneration).

As shown in FIG. 1, the inverters 10 are controlled by the rotating electrical machine control device 1. The rotating electrical machine control device 1 is constructed using a logic circuit such as a microcomputer as a core member. For example, the rotating electrical machine control device 1 controls the rotating electrical machine 80 through the inverters 10 by performing current feedback control that uses a vector control method, based on a target torque of the rotating electrical machine 80 which is provided from another control device such as a vehicle control device which is not shown, etc. There is a plurality of control schemes for the inverters 10, such as torque control, current control, and voltage control, but in the present embodiment the inverters 10 are controlled by voltage control.

Actual current flowing through the stator coil 8 of each phase of the rotating electrical machine 80 is detected by a current sensor 15, and a magnetic pole position at each time point of a rotor of the rotating electrical machine 80 is detected by a rotation sensor 13 such as a resolver. The rotating electrical machine control device 1 performs current feedback control using results of the detection by the current sensor 15 and the rotation sensor 13. The rotating electrical machine control device 1 is constructed to include various functional parts for current feedback control, and each functional part is implemented by cooperation of hardware such as a microcomputer and software (program).

As shown in FIG. 1, a control terminal of each switching element 3 (a gate terminal in a case of an IGBT or a FET) included in the inverters 10 is connected to the rotating electrical machine control device 1 through a drive circuit 2 (DRV), and switching control is individually performed on the switching elements 3. High-voltage system circuits for driving the rotating electrical machine 80, such as the inverters 10 (systems connected to the direct-current power supplies 6), and a low-voltage system circuit such as the rotating electrical machine control device 1 that uses a microcomputer, etc., as a core (a system with an operating voltage on the order of 3.3 volts to 5 volts) significantly differ from each other in operating voltage (the power supply voltage of the circuits). The drive circuits 2 improve driving capabilities (e.g., capabilities to allow a circuit at a subsequent stage to operate, such as voltage amplitude and output current) of a drive signal (switching control signal) for each switching element 3, and relays the drive signal. A first drive circuit 21 relays switching control signals to the first inverter 11, and a second drive circuit 22 relays switching control signals to the second inverter 12.

The rotating electrical machine control device 1 has two control modes, e.g., pulse width modulation (PWM) control and rectangular-wave control (single-pulse control (1-Pulse)), as switching pattern modes (modes of voltage waveform control) of the switching elements 3 included in the first inverter 11 and the second inverter 12. In addition, the rotating electrical machine control device 1 has, as modes of stator's field control, field regulation control such as normal field control, e.g., maximum torque control that outputs maximum torque with respect to current flowing through the rotating electrical machine 80, and maximum efficiency control that drives a motor at maximum efficiency with respect to motor current, field weakening control that weakens field flux by allowing field current (d-axis current Id) that does not contribute to torque to flow or, oppositely, field strengthening control that strengthens field flux.

In addition, the rotating electrical machine control device 1 can perform shutdown control or active short-circuit control (ASC) as fail-safe control performed when an abnormality has detected in the inverters 10 or the rotating electrical machine 80. The shutdown control is control that brings the inverters 10 into an off state by bringing switching control signals for all switching elements 3 included in the inverters 10 into an inactive state. The active short-circuit control is control that brings either one side, the upper-stage-side switching elements 3H of the arms 3A for all of the plurality of phases or the lower-stage-side switching elements 3L of the arms 3A for all of the plurality of phases, into an on state and bringing the other side into an off state. Note that a case in which the upper-stage-side switching elements 3H of the arms 3A for all of the plurality of phases is brought into an on state and the lower-stage-side switching elements 3L of the arms 3A for all of the plurality of phases is brought into an off state is referred to as upper-stage-side active short-circuit control. Note also that a case in which the lower-stage-side switching elements 3L of the arms 3A for all of the plurality of phases are brought into an on state and the upper-stage-side switching elements 3H of the arms 3A for all of the plurality of phases is brought into an off state is referred to as lower-stage-side active short-circuit control.

Meanwhile, when, as in the present embodiment, the inverters 10 are connected to both ends of each stator coil 8, respectively, if one of the inverters 10 is short-circuited by active short-circuit control, then the multiphase stator coils 8 are short-circuited at the one of the inverters 10. That is, the one of the inverters 10 serves as a neutral point and the stator coils 8 are Y-connected. Depending on the control schemes, a mode in which the open-end winding type rotating electrical machine 80 is controlled through the two inverters 10 and a mode in which the Y-connected rotating electrical machine 80 is controlled through a single inverter 10 (an inverter 10 on a side that is not subjected to active short-circuit control) can be implemented. Hence, in the present embodiment, active short-circuit control is also included not only as fail-safe control but also as a control mode that can be selected in normal control.

Namely, the rotating electrical machine control device 1 has pulse width modulation control that outputs a plurality of pulses with different patterns in a single electrical angle cycle, active short-circuit control that brings the upper-stage-side switching elements 3H of the arms 3A for all of the plurality of phases into an on state or brings the lower-stage-side switching elements 3L of the arms 3A for all of the plurality of phases into an on state, and rectangular-wave control that outputs a single pulse in a single electrical angle cycle, as control schemes for the first inverter 11 and the second inverter 12. Here, one of the plurality of control schemes is a first control scheme, and one control scheme different than the first control scheme is a second control scheme. For example, when the first control scheme is pulse width modulation control, the second control scheme is active short-circuit control or rectangular-wave control. Then, the rotating electrical machine control device 1 has a control mode in which the first inverter 11 is controlled by the first control scheme and the second inverter 12 is controlled by the second control scheme. Of course, the rotating electrical machine control device 1 also has a control mode in which the first inverter 11 and the second inverter 12 are controlled by the same control scheme. Namely, the rotating electrical machine control device 1 has a control mode in which the first inverter 11 and the second inverter 12 are controlled by the same control scheme, and a control mode in which the first inverter 11 and the second inverter 12 are controlled by different control schemes.

Note that the above describes that the rotating electrical machine control device 1 has pulse width modulation control, active short-circuit control, and rectangular-wave control as control schemes for the first inverter 11 and the second inverter 12. However, the rotating electrical machine control device 1 is not limited to having a mode in which the rotating electrical machine control device 1 has those three control schemes, and may have at least any two of those control schemes. For example, the rotating electrical machine control device 1 may have, as control schemes for the first inverter 11 and the second inverter 12, pulse width modulation control and active short-circuit control, or pulse width modulation control and rectangular-wave control.

Though details will be described later, in the present embodiment, the rotating electrical machine control device 1 has four control modes (a first control mode (mode1), a second control mode (mode2), a third control mode (mode3), and a fourth control mode (mode4)) as shown in the following table 2.

TABLE 2

| mode  | inv1    | inv2    |
|-------|---------|---------|
| mode1 | PWM     | ASC     |
| mode2 | PWM     | PWM     |
| mode3 | 1-Pulse | PWM     |
| mode4 | 1-Pulse | 1-Pulse |

Of the control modes, the first control mode (mode1) and the third control mode (mode3) correspond to control modes in which the first inverter 11 is controlled by the first control scheme and the second inverter 12 is controlled by the second control scheme. The first control scheme in the first control mode is pulse width modulation control (PWM) and the second control scheme is active short-circuit control (ASC). In addition, the first control scheme in the third control mode is rectangular-wave control (1-Pulse) and the second control scheme is pulse width modulation control (PWM). Note that such a combination of the first control scheme and the second control scheme in each control mode is an example, and other combinations may be adopted. Note also that for the types of control schemes, too, control schemes other than active short-circuit control (ASC), pulse width modulation control (PWM), and rectangular-wave control (1-Pulse) may be included.

In the first control mode, only either one of the first inverter 11 and the second inverter 12 is controlled using pulse width modulation control, and the other is controlled using active short-circuit control. In a mode exemplified in table 2, only the first inverter 11 is controlled using pulse width modulation control and the second inverter 12 is controlled using active short-circuit control. When the second inverter 12 is controlled using active short-circuit control, it is equivalent to driving the rotating electrical machine 80 by a single inverter.

Pulse width modulation includes schemes such as continuous PWM (CPWM), e.g., sinusoidal PWM (SPWM) and space vector PWM (SVPWM), and discontinuous PWM (DPWM). In the discontinuous PWM, for example, the signal level of a switching control signal of the inverter for one phase among three-phase alternating-current electric power is sequentially fixed, and the signal levels of switching control signals for the other two phases are changed. In the continuous PWM, all phases are modulated without thus fixing a switching control signal for any one of the phases. Those modulation schemes are determined based on operation conditions such as rotational speed and torque that are required for the rotating electrical machine 80, and a modulation index (a ratio of a root-mean-square value of three-phase alternating-current phase-to-phase voltage to a root-mean-square value of direct-current voltage) required to satisfy the operation conditions.

The first control mode and the second control mode are control modes used when the operation conditions of the rotating electrical machine 80 are low rotational speed and low torque compared to the third control mode and the fourth control mode, and a pulse width modulation scheme is continuous PWM. The third control mode is a control mode used when the operation conditions of the rotating electrical machine 80 are high rotational speed and high torque compared to the second control mode, and a pulse width modulation scheme is continuous PWM and discontinuous PWM. For example, in the third control mode, in a case of relatively low rotational speed and relatively low torque, modulation is performed by continuous PWM, and in a case of relatively high rotational speed and relatively high torque, modulation is performed by discontinuous PWM.

Figure 8:
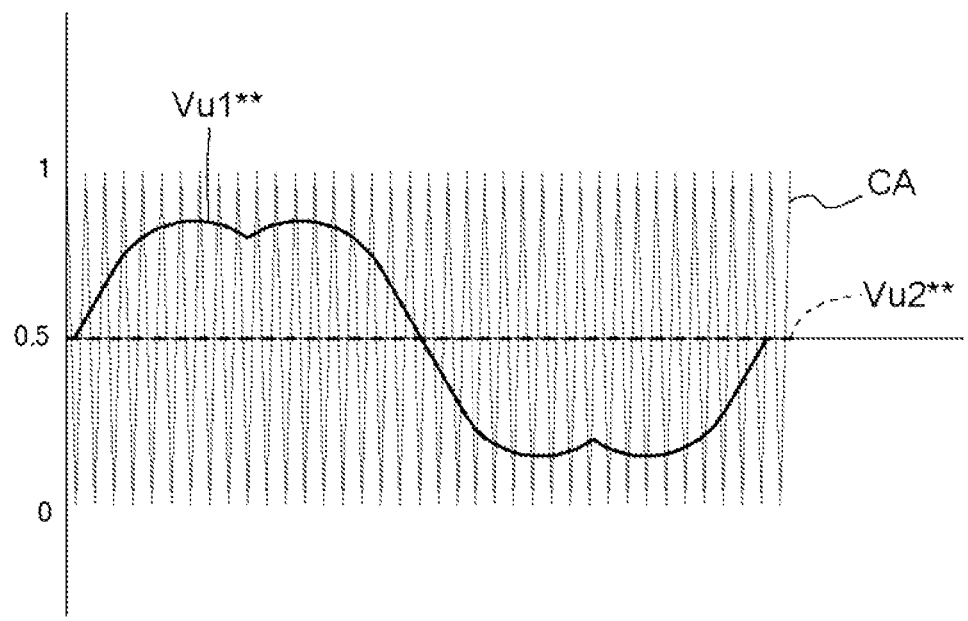
FIG. 8 is a waveform diagram showing an example of U-phase voltage instructions in the first control mode.

In pulse width modulation, pulses are generated based on a magnitude relationship between the amplitude of an alternating-current waveform (e.g., alternating-current voltage waveform) which is an output instruction and the amplitude of the waveform of a triangle wave (including sawtooth wave) carrier (see FIG. 8, etc.). There is also a case in which a PWM waveform is directly generated by digital computation instead of a comparison with the carrier, but in that case, too, the amplitude of an alternating-current waveform which is an instruction value and the amplitude of a virtual carrier waveform have a correlation.

In pulse width modulation by digital computation, a carrier is determined, for example, based on a control cycle of the rotating electrical machine control device 1 such as a computation cycle of the microcomputer or a duty cycle of an electronic circuit. That is, even when multiphase alternating-current electric power is used to drive the alternating-current rotating electrical machine 80, a carrier has a cycle that is not constrained by (a cycle that is not synchronized with) the rotational speed or rotational angle (electrical angle) of the rotating electrical machine 80. Therefore, both the carrier and each pulse generated based on the carrier are not synchronized with the rotation of the rotating electrical machine 80. Therefore, modulation schemes such as sinusoidal PWM and space vector PWM may be referred to as "asynchronous modulation schemes". On the other hand, a modulation scheme in which pulses are generated in synchronization with the rotation of the rotating electrical machine 80 is referred to as "synchronous modulation scheme". For example, in rectangular-wave control (rectangular-wave modulation), since a single pulse is outputted per electrical angle cycle of the rotating electrical machine 80, the rectangular-wave modulation is a synchronous modulation scheme.

Meanwhile, as an index indicating a modulation index from direct-current voltage to alternating-current voltage, there is a modulation index indicating a ratio of a root-mean-square value of line-to-line voltage of multiphase alternating-current voltage to a root-mean-square value of direct-current voltage. In general, the maximum modulation index of sinusoidal PWM is about 0.61 ($\approx$0.612) and the maximum modulation index of space vector PWM control is about 0.71 ($\approx$0.707). A modulation scheme having a modulation index exceeding about 0.71 is referred to as "overmodulation pulse width modulation" as a modulation scheme whose modulation index is higher than normal. The maximum modulation index of the "overmodulation pulse width modulation" is about 0.78. The modulation index "0.78" is a physical (mathematical) limit value for electric power conversion from direct current to alternating current. In the overmodulation pulse width modulation, when the modulation index reaches 0.78, the overmodulation pulse width modulation changes to rectangular-wave modulation (single-pulse modulation) that outputs a single pulse in a single electrical angle cycle. In the rectangular-wave modulation, the modulation index is fixed at about 0.78 which is a physical limit value.

The overmodulation pulse width modulation with a modulation index less than 0.78 can be implemented by using the principle of either one of the synchronous modulation scheme and the asynchronous modulation scheme. A representative modulation scheme is discontinuous PWM. The discontinuous PWM can be implemented by using the principle of either one of the synchronous modulation scheme and the asynchronous modulation scheme. For example, when the synchronous modulation scheme is used, in rectangular-wave modulation a single pulse is outputted in a single electrical angle cycle, whereas in the discontinuous PWM a plurality of pulses is outputted in a single electrical angle cycle. When there is a plurality of pulses in a single electrical angle cycle, a pulse enabled period decreases accordingly, reducing the modulation index. Therefore, not only a modulation index fixed at about 0.78, but also an arbitrary modulation index less than 0.78 can be implemented by the synchronous modulation scheme. For example, multi-pulse modulation (Multi-Pulses) such as 9-pulse modulation (9-Pulses) that outputs nine pulses in a single electrical angle cycle or 5-pulse modulation (5-Pulses) that outputs five pulses in a single electrical angle cycle is also possible.

Meanwhile, when vector control is performed on a single inverter 10, eight space vectors can be defined depending on the states of the three-phase arms 3A. Specifically, eight space vectors can be defined by a combination of the signal levels of switching control signals for the upper-stage-side switching elements 3H ($2^3$=8). Note that the signal levels of three-phase switching control signals for the lower-stage-side switching elements 3L are complementary signal levels to those of the switching control signals for the upper-stage-side switching elements 3H. Hence, a space vector can be defined by the signal levels of switching control signals for either one of the upper-stage side and the lower-stage side.

When the signal levels of switching control signals for a U-phase, a V-phase, and a W-phase are represented by (UVW) with a high signal level of each switching control signal being "1" and a low signal level being "0", there are eight space vectors: (000), (001), (010), (011), (100), (101), (110), and (111). Note that of the eight space vectors, (000) and (111) have zero phase-to-phase voltage and voltage is not applied to the rotating electrical machine 80, and thus, (000) and (111) are referred to as a zero vector or a null vector, and indicate the same set of coordinates in a d-q-axis vector coordinate system. On the other hand, the other six space vectors are referred to as active vectors, and indicate different sets of coordinates in the d-q-axis vector coordinate system.

When, as shown in FIG. 1, vector control is performed on the two inverters 10, 64 space vectors can be defined by the signal levels of switching control signals for either one of the upper-stage side and the lower-stage side ($2^6$=64). Of those space vectors, 10 space vectors are null vectors. When the signal levels for the U-phase ($U_1$-phase), the V-phase ($V_1$-phase), and the W-phase ($W_1$-phase) of the first inverter 11 and the signal levels for the U-phase ($U_2$-phase), the V-phase ($V_2$-phase), and the W-phase ($W_2$-phase) of the second inverter 12 are represented by ($U_1V_1W_1$-$U_2V_2W_2$), 10 space vectors, (000-000), (001-001), (010-010), (011-011), (100-100), (101-101), (110-110), (111-111), (000-111), and (111-000), are null vectors with zero phase-to-phase voltage. The other 54 space vectors are active vectors having effective magnitudes from the origin (the coordinates of a null vector) to 18 different sets of coordinates in the d-q-axis vector coordinate system.

Figure 2:
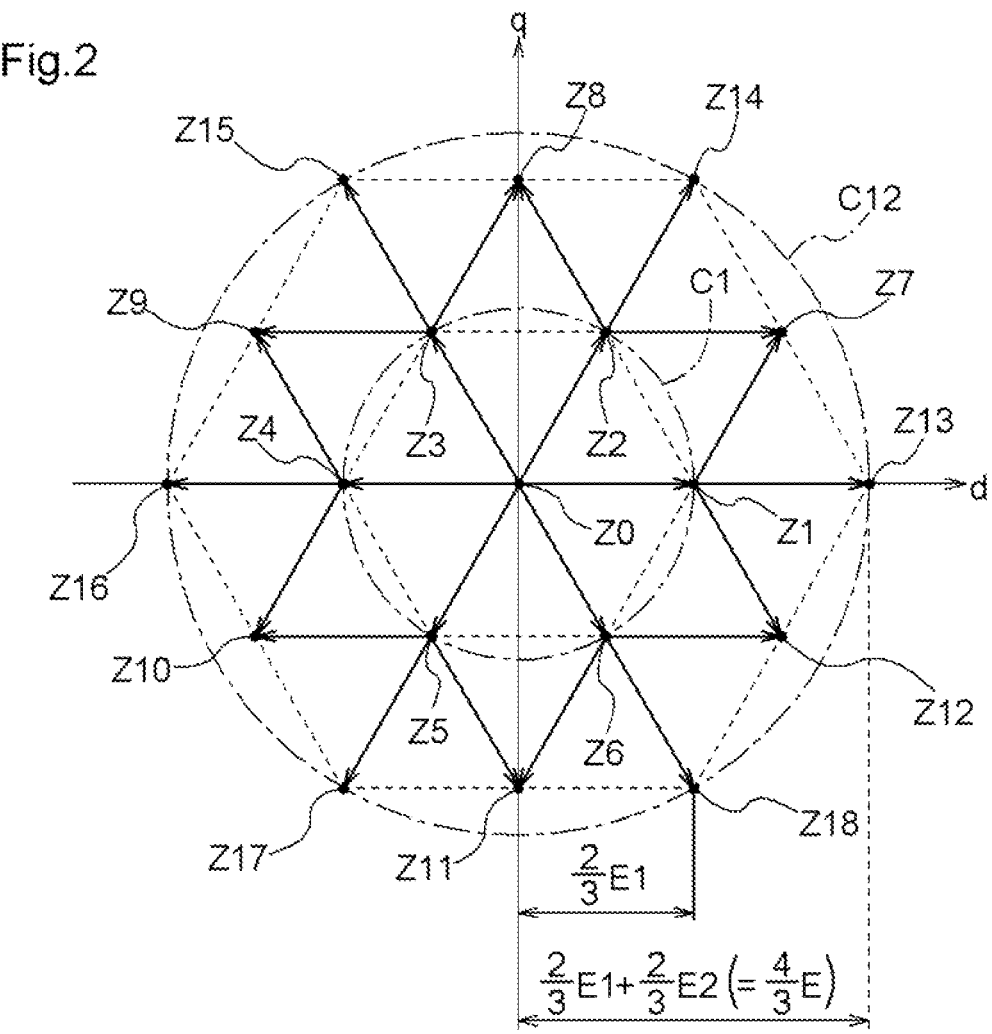
FIG. 2 is a vector diagram of the rotating electrical machine drive system using two inverters.

FIG. 2 plots the coordinates of the null vector and the coordinates of active vectors at 18 points. Z0 indicates the coordinates of the null vector in the d-q-axis vector coordinate system (10 vectors have the same set of coordinates). Z1 to Z6 indicate the coordinates of active vectors that are implemented by substantially a single inverter 10 in the d-q-axis vector coordinate system. Z7 to Z18 indicate coordinates corresponding to active vectors implemented by the two inverters 10 in the d-q-axis vector coordinate system.

Z1 includes (000-011), (100-000), (100-111), and (111-011), Z2 includes (000-001), (110-000), (110-111), and (111-001), Z3 includes (000-101), (010-000), (010-111), and (111-101), Z4 includes (000-100), (011-000), (011-111), and (111-100), Z5 includes (000-110), (001-000), (001-111), and (111-110), and Z6 includes (000-010), (101-000), (101-111), and (111-010). These 24 space vectors are combinations of a null vector which is a space vector of one of the inverters 10 and an active vector which is a space vector of the other inverter 10.

Note that 12 space vectors, Z1: (101-001) and (110-010), Z2: (010-011) and (100-101), Z3: (011-001) and (110-100), Z4: (001-101) and (010-110), Z5: (011-010) and (101-100), and Z6: (001-011) and (100-110), also indicate the coordinates of Z1 to Z6, respectively. Note, however, that they are combinations of active vectors of both of the two inverters 10 instead of including a null vector of one inverter 10.

Z7, Z8, Z9, Z10, Z11, and Z12 correspond to 12 space vectors, i.e., Z7 corresponds to (100-001) and (110-011), Z8 to (010-001) and (110-101), Z9 to (010-100) and (011-101), Z10 to (001-100) and (011-110), Z11 to (001-010) and (101-110), and Z12 to (100-010) and (101-011). In addition, Z13, Z14, Z15, Z16, Z17, and Z18 correspond to six space vectors, i.e., Z13 corresponds to (100-011), Z14 to (110-001), Z15 to (010-101), Z16 to (011-100), Z17 to (001-110), and Z18 to (101-010).

Figure 3:
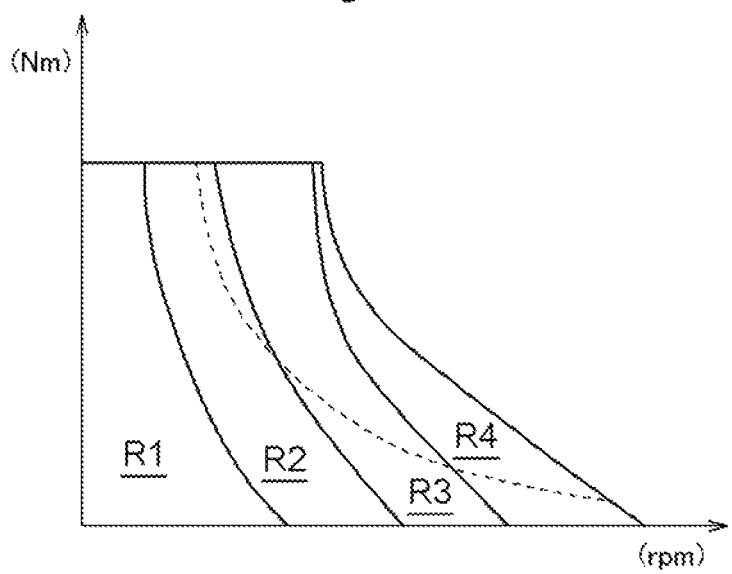
FIG. 3 is a diagram showing control regions of a rotating electrical machine by a relationship between rotational speed and torque.

FIG. 3 shows control regions of the rotating electrical machine 80 by a relationship between rotational speed and torque. The outermost solid line indicates a control region implemented using the two inverters 10, and a dashed line indicates a control region that can be implemented using a single inverter 10. A first region R1 indicates a control region corresponding to the above-described first control mode, a second region R2 indicates a control region corresponding to the second control mode, a third region R3 indicates a control region corresponding to the third control mode, and a fourth region R4 indicates a control region corresponding to the fourth control mode.

The first region R1 is a control region with the lowest rotational speed and the lowest torque, and the entire first region R1 is included in the control region that can be implemented using a single inverter 10 (more on a lower rotational speed and lower torque side than the dashed line in FIG. 3). That is, in the first region R1, the rotating electrical machine 80 can be driven by a single inverter 10. In the present embodiment, as shown in table 2, drive of the rotating electrical machine 80 is controlled by the first control mode in which the second inverter 12 is brought into a short-circuited state by active short-circuit control and pulse width modulation control is performed on the first inverter 11.

The second region R2 is a control region with higher rotational speed than the first region R1. As shown in FIG. 3, a part of the second region R2 on a high torque side includes a region with higher rotational speed than the control region that can be implemented using a single inverter 10 (more on the lower rotational speed and lower torque side than the dashed line in FIG. 3). That is, in the second region R2, the rotating electrical machine 80 cannot be driven by a single inverter 10 in the entire region, and the rotating electrical machine control device 1 drives the rotating electrical machine 80 using the two inverters 10. The second region R2 is a control region with relatively low rotational speed and relatively low torque in the entire control region, and thus, does not require a high modulation index. In the present embodiment, as shown in table 2, drive of the rotating electrical machine 80 is controlled by the second control mode in which pulse width modulation control is performed on both the first inverter 11 and the second inverter 12.

The third region R3 is a control region with higher rotational speed than the second region R2. As shown in FIG. 3, most of the third region R3, particularly, a region on a high torque side, is a region with higher rotational speed than the control region that can be implemented using a single inverter 10 (more on the lower rotational speed and lower torque side than the dashed line in FIG. 3). As with the second region R2, in the third region R3, too, the rotating electrical machine 80 cannot be driven by a single inverter 10 in the entire region, and the rotating electrical machine control device 1 drives the rotating electrical machine 80 using the two inverters 10. The third region R3 is a control region with relatively high rotational speed and relatively high torque in the entire control region, and thus requires a high modulation index. In the present embodiment, as shown in table 2, drive of the rotating electrical machine 80 is controlled by the third control mode in which rectangular-wave control is performed on the first inverter 11 and pulse width modulation control is performed on the second inverter 12.

For the pulse width modulation control in the third control mode, it is preferred to use space vector PWM and discontinuous PWM that can perform output with a higher modulation index than the space vector PWM. Note that since the first inverter 11 is controlled using synchronous modulation (rectangular-wave modulation), by controlling the second inverter 12 by synchronous modulation, too, it is easy to make the phase of alternating-current voltage of the first inverter 11 and the phase of alternating-current voltage of the second inverter 12 different from each other by 180 degrees. As described above, the discontinuous PWM can also be implemented using synchronous modulation (multi-pulse modulation). It is preferred to use discontinuous PWM by synchronous modulation (multi-pulse modulation) as the pulse width modulation that controls the second inverter 12 in the third control mode.

The fourth region R4 is a control region with the highest rotational speed and the highest torque, and almost the entire fourth region R4, excluding a part of the region with low torque, is included in the control region that cannot be implemented using a single inverter 10 (more on a higher rotational speed and higher torque side than the dashed line in FIG. 3). As shown in table 2, in the fourth region R4, the rotating electrical machine 80 is driven by control using the fourth control mode in which rectangular-wave control is performed on both of the two inverters 10.

As described with reference to table 2, FIGS. 2 and 3, etc., the rotating electrical machine control device 1 can change a control scheme for controlling the first inverter 11 and a control scheme for controlling the second inverter 12 independently of each other. It is preferred that the rotating electrical machine control device 1 change each control scheme based on the rotational speed of the rotating electrical machine 80. Alternatively, it is preferred that the rotating electrical machine control device 1 change each control scheme based on a ratio of a root-mean-square value of three-phase alternating-current electric power to a root-mean-square value of direct-current electric power (e.g., a modulation index (which may be an instruction value or may be an equivalent from output voltage)). In addition, the control schemes may be changed based on an index other than the rotational speed of the rotating electrical machine 80 and the ratio of the root-mean-square value of three-phase alternating-current electric power to the root-mean-square value of direct-current electric power. For example, the control schemes may be changed based on output torque from the rotating electrical machine 80. Alternatively, the control schemes may be changed based on three-phase alternating-current electric power, three-phase alternating-current, three-phase alternating-current voltage, or the root-mean-square values of these electric power, current, and voltage.

Furthermore, when the rotating electrical machine control device 1 can change a control scheme for controlling the first inverter 11 and a control scheme for controlling the second inverter 12 independently of each other, it is preferred to set the control schemes for the first inverter 11 and the second inverter 12 such that output from either one is greater than or equal to output from the other. Though specific description will be made below with reference to tables 3 and 4, etc., shown below in addition to table 2, each inverter can be appropriately constructed according to the operation of the two inverters. For example, an inverter that is more likely to operate at relatively high output (e.g., a relatively high modulation index) can be constructed to have higher reliability, and an inverter that is more likely to operate at relatively low output (e.g., a relatively low modulation index) can be constructed not to have excessive performance.

In addition, as described above, the third region R3 is a control region with relatively high rotational speed and relatively high torque in the entire control region. Hence, when, in the third control mode, discontinuous PWM using synchronous modulation (multi-pulse modulation) is used as pulse width modulation that controls the second inverter 12, synchronized rotational speed also increases and the frequency of pulses also increases. When asynchronous modulation (space vector PWM) is used as pulse width modulation that controls the second inverter 12, too, since the rotational speed is high, there is a tendency that the frequency of a carrier increases and the frequency of pulses also increases.

The control scheme for the first inverter 11 in the third control mode is rectangular-wave control and thus the frequency of pulses that control the first inverter 11 is lower than that of the second inverter 12. In the second control mode, pulse width modulation control is performed on both of the two inverters 10, and thus, the frequencies of pulses are equal to each other. In addition, in the first control mode, pulse width modulation is performed only on the first inverter 11, but since the rotational speed of the rotating electrical machine 80 is low, the frequency of pulses is low compared to that in the third control mode.

In the present embodiment, the first inverter 11 is an inverter 10 that is controlled by pulses with a relatively low switching frequency when pulse width modulation control is performed. On the other hand, the second inverter 12 is an inverter 10 that is controlled by pulses with a relatively high switching frequency when pulse width modulation control is performed. Hence, the first inverter 11 can be constructed using the first switching elements 31 whose switching loss upon a transition between an off state and an on state is relatively large, and the second inverter 12 can be constructed using the second switching elements 32 whose switching loss is relatively small. For example, Si-IGBTs or Si-MOSFETs can be used as the first switching elements 31, and SiC-MOSFETs, GaN-MOSFETs, or SiC-IGBTs can be used as the second switching elements 32.

Silicon carbide (SiC) is a compound semiconductor material made of silicon (Si) and carbon (C). SiC has excellent physical properties that the dielectric breakdown field strength is on the order of 10 times that of Si and the bandgap is a wide bandgap on the order of three times that of Si. Furthermore, SiC allows to control a p-type and an n-type required to fabricate a device in a wide range. Due to the dielectric breakdown field strength of SiC being higher than that of Si, when a high-breakdown voltage power device is constructed using SiC, compared to a case in which the device is constructed using Si, a drift layer with high impurity concentration and a thin film thickness can be formed. Since almost all resistive component of the high-breakdown voltage power device is the resistance of the drift layer, the on-resistance per unit area of the SiC device is very low compared to the Si device. For example, if the breakdown voltage is theoretically the same, then the resistance of the drift layer of the SiC device can be reduced to the order of 1/300 per area compared to the resistance of the drift layer of the Si device.

In addition, the Si device is often constructed as a minority carrier device (bipolar device) such as an IGBT in order to improve an increase in on-resistance associated with an increase in breakdown voltage. Note, however, that the IGBT has large switching loss and has high heat generation in high-frequency driving. On the other hand, the SiC device can implement high breakdown voltage with a majority carrier device (a Schottky barrier diode or a MOSFET) having a high-speed device structure. That is, the SiC device can implement an increase in breakdown voltage, a reduction in on-resistance, and an increase in speed compared to the Si device. In addition, SiC has wide bandgap and thus can implement a power device that can operate even at higher temperatures than Si. The same can also be said for gallium nitride (GaN). Therefore, it is preferred to use particularly SiC-MOSFETs or GaN-MOSFETs as the second switching elements 32.

Meanwhile, the above description exemplifies, with reference to table 2, a mode corresponding to a control mode in which in the first control mode (mode1) and the third control mode (mode3) among the four control modes, the first inverter 11 is controlled by the first control scheme and the second inverter 12 is controlled by the second control scheme. For example, in the first control mode, the first control scheme is pulse width modulation control (PWM) and the second control scheme is active short-circuit control (ASC). In addition, the first control scheme in the third control mode is rectangular-wave control (1-Pulse) and the second control scheme is pulse width modulation control (PWM). However, a distinction between the first control scheme and the second control scheme is not limited to a difference in control schemes such as active short-circuit control (ASC), pulse width modulation control (PWM), and rectangular-wave control (1-Pulse). For example, even if the control scheme is pulse width modulation control (PWM), it can be said that continuous PWM (CPWM) and discontinuous PWM (DPWM) are different control schemes, and even if the control scheme is discontinuous PWM, it can be said that asynchronous modulation and synchronous modulation are different control schemes. The following table 3 exemplifies different modes than those of table 2.

TABLE 3

| mode | inv1 | inv2 |
| --- | --- | --- |
| mode1 | CPWM [asynchronous] | ASC |
| mode2 | DPWM [asynchronous] | CPWM [asynchronous] |
| mode3 | 1-Pulse [synchronous] | CPWM [asynchronous] DPWM [asynchronous] Multi-Pulses(DPWM) [synchronous] |
| mode4 | 1-Pulse [synchronous] | 1-Pulse [synchronous] |

As shown in table 3, when, in the second control mode (mode2), the first inverter 11 is controlled using discontinuous PWM (DPWM) and the second inverter 12 is controlled using continuous PWM (CPWM), the first inverter 11 is controlled by the first control scheme and the second inverter 12 is controlled by the second control scheme. In addition, as shown in table 3, by further subdividing the third control mode (mode3), the second inverter 12 may be controlled using a plurality of control schemes.

As described above, the rotating electrical machine control device 1 can change each control scheme based on a ratio of a root-mean-square value of three-phase alternating-current electric power to a root-mean-square value of direct-current electric power (e.g., a modulation index (which may be an instruction value or may be an equivalent from output voltage)). In the present embodiment, the terminal-to-terminal voltage "E1" of the first direct-current power supply 61 and the terminal-to-terminal voltage "E2" of the second direct-current power supply 62 are identical (both are voltage "E"). When the root-mean-square value on the alternating-current side of the first inverter 11 is "Va_inv1" and the root-mean-square value on the alternating-current side of the second inverter 12 is "Va_inv2", the modulation index "Mi_inv1" of the first inverter 11" and the modulation index "Mi_inv2" of the second inverter 12 are as shown in the following equations (1) and (2). In addition, the modulation index "Mi_sys" of the entire system is as shown in the following equation (3).

$$Mi\_inv1 = Va\_inv1/E1 = Va\_inv1/E \quad (1)$$

$$Mi\_inv2 = Va\_inv2/E2 = Va\_inv2/E \quad (2)$$

$$Mi\_sys = (Va\_inv1 + Va\_inv2)/(E1 + E2) \quad (3)$$
$$= (Va\_inv1 + Va\_inv2)/2E$$

For the instantaneous value of voltage, vectors which will be described later with reference to FIGS. 4 to 7 need to be considered, but when only the modulation indices are simply considered, the modulation index "Mi_sys" of the entire system is "(Mi_inv1+Mi_inv2)/2" from equations (1) to (3).

For example, the first control mode shown in table 3 is selected when the modulation index "Mi_sys" of the entire system is less than a first reference modulation index M1 (e.g., "0.25"). Since active short-circuit control is performed on the second inverter 12, the modulation index "Mi_inv2" is zero. Therefore, the modulation index "Mi_sys" of the entire system needs to be achieved by only the first inverter 11. Hence, the first inverter 11 is controlled using continuous PWM control (CPWM) in a range in which the modulation index "Mi_inv1" is less than "0.6=0.25×2+0.1", including a margin α (e.g., "0.1") for preventing hunting between control modes.

The second control mode is selected when the modulation index "Mi_sys" of the entire system is greater than or equal to the first reference modulation index M1 (e.g., "0.25") and less than a second reference modulation index M2 (e.g., "0.5"). When, as shown in table 2, the first inverter 11 and the second inverter 12 are controlled using the same control scheme, the first inverter 11 and the second inverter 12 are controlled using continuous PWM control (CPWM) or discontinuous PWM control (DPWM) such that the modulation indices "Mi_inv1" and "Mi_inv2" of the two inverters are in a range of "0.25 to 0.5". When, as shown in table 3, the first inverter 11 and the second inverter 12 are controlled by different pulse width control schemes, the first inverter 11 is controlled using discontinuous PWM control (DPWM) and the second inverter 12 is controlled using continuous PWM control (CPWM) such that the modulation index "Mi_sys" of the entire system is in a range of "0.25 to 0.5" and "Mi_inv1>Mi_inv2". Here, it is assumed, for example, that the maximum value of the modulation index "Mi_inv1" of the first inverter 11 in the second control mode is "0.56" and the maximum value of the modulation index "Mi_inv2" of the second inverter 12 is "0.44". Note that as with the margin α in the first control mode, in order to prevent hunting between control modes, for example, a margin may be set on an upper-limit side of a modulation index range.

The third control mode is selected when the modulation index "Mi_sys" of the entire system is greater than or equal to the second reference modulation index M2 (e.g., "0.5") and less than the maximum modulation index "0.78". Since the first inverter 11 is controlled using rectangular-wave control (1-Pulse), the modulation index "Mi_inv1" thereof is fixed at "0.78". To satisfy the modulation index "Mi_sys" of the entire system, the second inverter 12 is controlled in a range in which the modulation index "Mi_inv2" is greater than or equal to "0.22" and less than "0.78". On a side of this range close to the lower-limit modulation index "0.22", as shown in table 3, the second inverter 12 is controlled using continuous PWM control (CPWM). In addition, on a side of this range close to the upper-limit modulation index "0.78", as shown in table 3, the second inverter 12 is controlled using multi-pulse modulation control (Multi-Pulses). At intermediate modulation indices in this range, the second inverter 12 is controlled using discontinuous PWM control (DPWM). Note that as with the margin α in the first control mode, in order to prevent hunting between control modes, for example, a margin may be set on a lower-limit side of a modulation index range.

In the fourth control mode, the modulation index "Mi_sys" of the entire system is fixed at the maximum modulation index "0.78". Since both the first inverter 11 and the second inverter 12 are controlled using rectangular-wave control (1-Pulse), the modulation indices "Mi_inv1" and "Mi_inv2" of the two inverters are fixed at "0.78". As such, the rotating electrical machine control device 1 can change control schemes based on the modulation index (which may be the instruction value of the modulation index or may be an equivalent from output voltage). In the following table 4, categories of the above-described modulation indices are added to the control modes of table 3. Note that "a" and "b"

in table 4 are arbitrary values, and it is preferred, for example, that "a" be on the order of "0.3 to 0.5" and "b" be on the order of "0.5 to 0.7".

TABLE 4

| mode | Mi_sys | | inv1 | | inv2 | Mi_inv2 |
|---|---|---|---|---|---|---|
| mode1 | M < 0.25 | CPWM | M < 0.6 | | ASC | M = 0 |
| mode2 | 0.25 ≤ M < 0.5 | DPWM | 0 4 ≤ M < 0.56 | | CPWM | 0.1 ≤ M < 0.44 |
| mode3 | 0.5 ≤ M < 0.78 | 1-Pulse | M = 0.78 | | CPWM DPWM Multi-Pulses | 0.22 ≤ M < a a ≤ M < b b ≤ M < 0.78 |
| mode4 | M = 0.78 | 1-Pulse | M = 0.78 | | 1-Pulse | M = 0.78 |

Note that the rotating electrical machine control device 1 may change control schemes based on voltage instructions (a voltage instruction "V1*" for the first inverter 11 and a voltage instruction "V2*" for the second inverter 12) which are indices equivalent to modulation indices (see voltage instructions Vu, etc., exemplified in FIG. 8**, etc.). For example, the first control mode is selected when the voltage instruction "V1*" for the first inverter 11 is less than a first voltage instruction reference value (the value of a voltage instruction corresponding to the first reference modulation index M1) and the voltage instruction "V2*" for the second inverter 12 is zero. The fourth control mode is selected when the voltage instruction "V1*" for the first inverter 11 and the voltage instruction "V2*" for the second inverter 12 have maximum values. Though detailed description and exemplification are omitted as it is easily understandable by the above description, for the second control mode and the third control mode, too, likewise, the rotating electrical machine control device 1 can change control schemes based on voltage instructions.

Meanwhile, when, as described above, a control scheme for controlling the first inverter 11 and a control scheme for controlling the second inverter 12 can be changed independently of each other, it is preferred that upon changing a combination of control schemes for the two inverters (11, 12), the rotating electrical machine control device 1 change a control scheme for either one of the inverters 10. If the control schemes for the two inverters (11, 12) are simultaneously changed, then it may become difficult to maintain continuity of control, which may affect the rotation of the rotating electrical machine 80. By changing a combination of control schemes for the two inverters (11, 12) by changing the control scheme for either one inverter 10 out of the two inverters (11, 12), the rotating electrical machine 80 can be stably controlled.

For example, when a control scheme for the first inverter 11 and a control scheme for the second inverter 12 are identical control schemes, the control scheme for either one of the inverters 10 is changed so as to obtain different control schemes, and when a control scheme for the first inverter 11 and a control scheme for the second inverter 12 are different control schemes, the control scheme for either one of the inverters 10 is changed so as to obtain another combination of different control schemes or obtain identical control schemes. The following table 5 shows an example of changing control schemes in such a manner. Note that it is preferred that the "mode" exemplified in table 5 be switched, for example, based on the modulation indices. Note also that though specific modulation indices are not shown, in modes exemplified in table 5, too, as with the modes exemplified in table 4, a mode1 side has a low modulation index and a mode4 side has a high modulation index.

TABLE 5

| mode | inv1 | inv2 |
|---|---|---|
| mode1 | CPWM | ASC |
| mode2-1 | CPWM | CPWM |
| mode2-2 | DPWM | CPWM |
| mode3-1 | 1-Pulse | CPWM |
| mode3-2 | 1-Pulse | DPWM |
| mode4 | 1-Pulse | 1-Pulse |

In mode1 shown in table 5, the first inverter 11 is controlled using continuous PWM and the second inverter 12 is controlled using active short-circuit control, and thus, the two inverters (11, 12) are controlled by different control schemes. In mode2-1, the first inverter 11 and the second inverter 12 both are controlled using continuous PWM, and thus, the two inverters (11, 12) are controlled by the same control scheme. Upon a transition from mode1 in which the two inverters (11, 12) are controlled by different control schemes to mode2-1 in which the two inverters (11, 12) are controlled by the same control scheme, the control scheme for the second inverter 12 which is either one inverter 10 is changed from active short-circuit control to continuous PWM control. Upon a transition from mode2-1 in which the two inverters (11, 12) are controlled by the same control scheme to mode1 in which the two inverters (11, 12) are controlled by different control schemes, the control scheme for the second inverter 12 which is either one inverter 10 is changed from continuous PWM control to active short-circuit control.

In mode2-2, the first inverter 11 is controlled using discontinuous PWM and the second inverter 12 is controlled using continuous PWM, and thus, the two inverters (11, 12) are controlled by different control schemes. Upon a transition from mode2-1 in which the two inverters (11, 12) are controlled by the same control scheme to mode2-2 in which the two inverters (11, 12) are controlled by different control schemes, the control scheme for the first inverter 11 which is either one inverter 10 is changed from continuous PWM control to discontinuous PWM control. Likewise, upon a transition from mode2-2 in which the two inverters (11, 12) are controlled by different control schemes to mode2-1 in which the two inverters (11, 12) are controlled by the same control scheme, the control scheme for the first inverter 11 which is either one inverter 10 is changed from discontinuous PWM control to continuous PWM control.

In mode3-1, the first inverter 11 is controlled using rectangular-wave modulation and the second inverter 12 is controlled using continuous PWM, and thus, the two inverters (11, 12) are controlled by different control schemes. Upon a transition from mode2-2 in which the two inverters (11, 12) are controlled by different control schemes to mode3-1 in which the two inverters (11, 12) are controlled by another combination of different control schemes, the control scheme for the first inverter 11 which is either one inverter 10 is changed from discontinuous PWM control to rectangular-wave control. Likewise, upon a transition from mode3-1 in which the two inverters (11, 12) are controlled by different control schemes to mode2-2 in which the two inverters (11, 12) are controlled by another combination of different control schemes, the control scheme for the first inverter 11 which is either one inverter 10 is changed from rectangular-wave modulation control to discontinuous PWM control.

In mode3-2, the first inverter 11 is controlled using rectangular-wave modulation and the second inverter 12 is controlled using discontinuous PWM, and thus, the two inverters (11, 12) are controlled by different control schemes. Upon a transition from mode3-1 in which the two inverters (11, 12) are controlled by different control schemes to mode3-2 in which the two inverters (11, 12) are controlled by another combination of different control schemes, the control scheme for the second inverter 12 which is either one inverter 10 is changed from continuous PWM to discontinuous PWM control. Likewise, upon a transition from mode3-2 in which the two inverters (11, 12) are controlled by different control schemes to mode3-1 in which the two inverters (11, 12) are controlled by another combination of different control schemes, the control scheme for the second inverter 12 which is either one inverter 10 is changed from discontinuous PWM control to continuous PWM control.

In mode4, both the first inverter 11 and the second inverter 12 are controlled using rectangular-wave modulation, and thus, the two inverters (11, 12) are controlled by the same control scheme. Upon a transition from mode3-2 in which the two inverters (11, 12) are controlled by different control schemes to mode4 in which the two inverters (11, 12) are controlled by the same control scheme, the control scheme for the second inverter 12 which is either one inverter 10 is changed from discontinuous PWM control to rectangular-wave control. Likewise, upon a transition from mode4 in which the two inverters (11, 12) are controlled by the same control scheme to mode3-2 in which the two inverters (11, 12) are controlled by different control schemes, the control scheme for the second inverter 12 which is either one inverter 10 is changed from rectangular-wave modulation control to discontinuous PWM control.

The first control mode to the fourth control mode will be described below mainly for the modes exemplified in table 2, with reference to voltage instructions and also to exemplary waveforms of output voltage and phase-to-phase voltage of the inverters 10 for some control modes.

Figure 4:
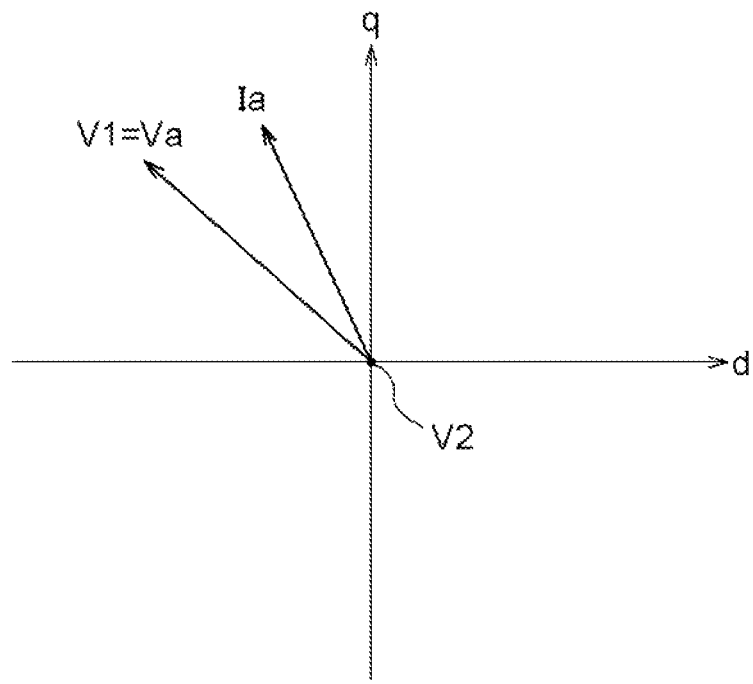
FIG. 4 is a vector diagram for a first control mode.
Figure 6:
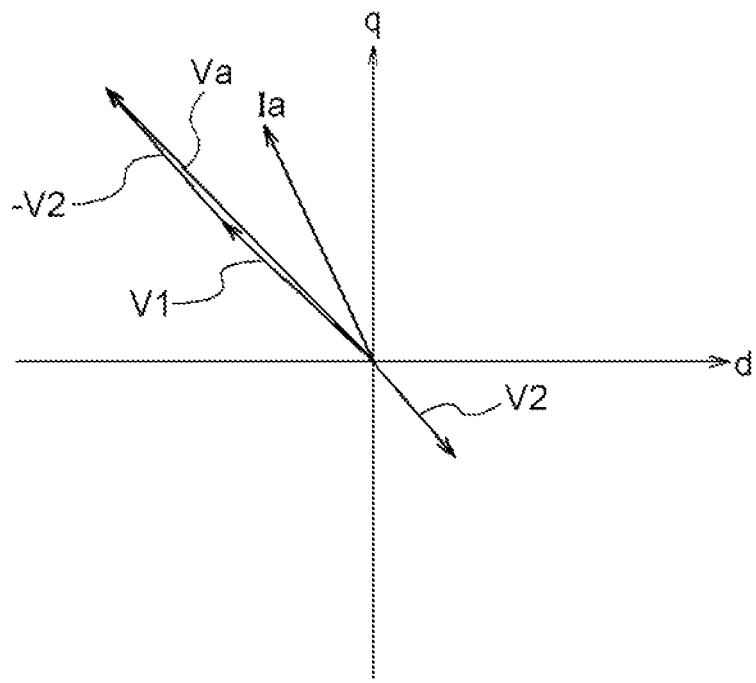
FIG. 6 is a vector diagram for a third control mode.
Figure 7:
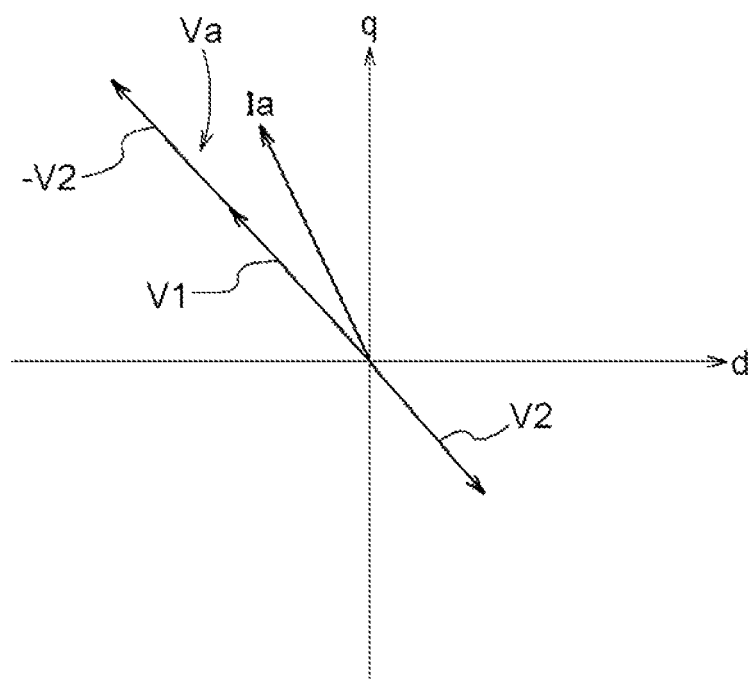
FIG. 7 is a vector diagram for a fourth control mode.

FIG. 4 exemplifies a vector diagram for one operating point in a d-q-axis vector coordinate system of the rotating electrical machine 80 whose drive is controlled in the first control mode. In the drawing, "V1" indicates a first voltage vector indicating voltage of the first inverter 11, and "V2" indicates a second voltage vector indicating voltage of the second inverter 12. Voltage appearing on the stator coils 8 which are open-end windings through the two inverters 10 corresponds to the difference "V1−V2" between the first voltage vector V1 and the second voltage vector V2. "Va" in the drawing indicates a combined voltage vector appearing on the stator coils 8. In the first control mode, active short-circuit control is performed on the second inverter 12, and the second voltage vector V2 is a null vector. Therefore, the combined voltage vector Va matches the first voltage vector V1. In addition, "Ia" indicates current flowing through the stator coils 8 of the rotating electrical machine 80. Note that the reference signs are hereinafter also the same for FIGS. 5 to 7 showing vector diagrams for the second control mode to the fourth control mode.

A waveform diagram of FIG. 8 shows an example of a first U-phase voltage instruction Vu1 which is a U-phase voltage instruction for the first inverter 11 in the first control mode, a second U-phase voltage instruction Vu2 which is a U-phase voltage instruction for the second inverter 12, and a carrier CA used upon pulse width modulation. In the present embodiment, the carrier CA is a triangle wave with a wave height of "1", i.e., the wave height changes between "0" and "1". The voltage instructions change in a range in which the minimum value is greater than "0" and the maximum value is smaller than "1". In sinusoidal PWM, a voltage instruction has a sine-wave shape, but the maximum modulation index remains at about 0.61. In the present embodiment, since space vector PWM with a maximum modulation index on the order of about 0.71 is performed, a sine-wave shaped voltage instruction is corrected.

As described above, in the first control mode, the second inverter 12 is short-circuited by active short-circuit control, and only the first inverter 11 functions as the inverter 10. For example, the maximum amplitude of U-phase voltage is "(2/3)E" with the voltage of the direct-current power supply 6 being "E" (see also the vector diagram of FIG. 2), and the maximum amplitude of phase-to-phase voltage is "E" with the voltage of the direct-current power supply 6 being "E" likewise.

Figure 5:
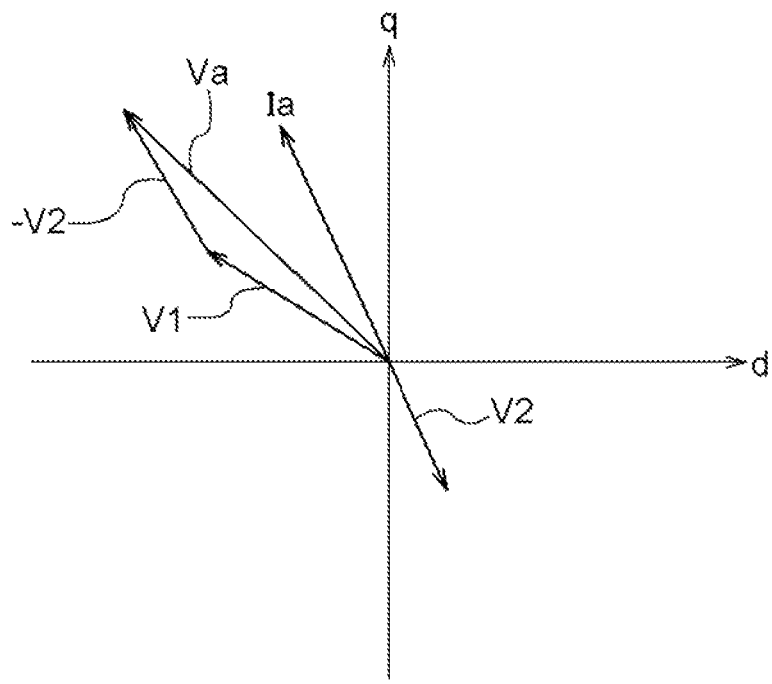
FIG. 5 is a vector diagram for a second control mode.
Figure 9:
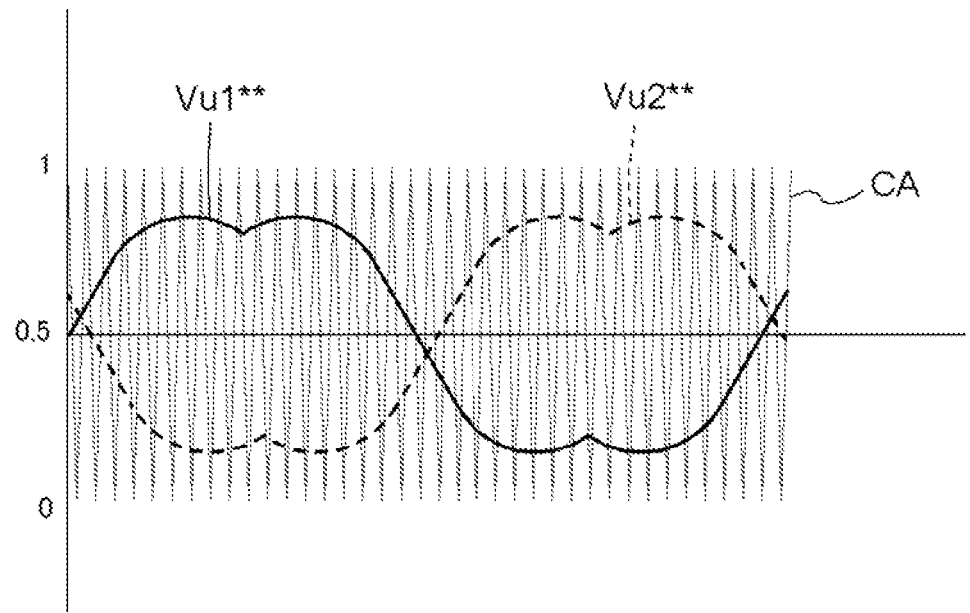
FIG. 9 is a waveform diagram showing an example of U-phase voltage instructions in the second control mode.
Figure 10:
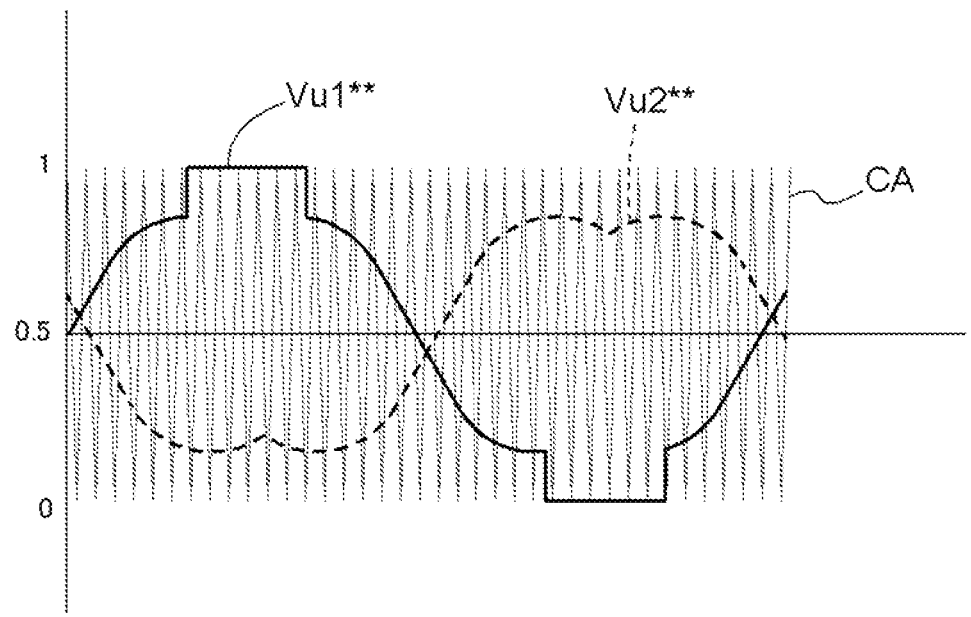
FIG. 10 is a waveform diagram showing another example of U-phase voltage instructions in the second control mode.

FIG. 5 exemplifies a vector diagram for one operating point in a d-q-axis vector coordinate system of the rotating electrical machine 80 whose drive is controlled in the second control mode. Waveform diagrams of FIGS. 9 and 10 show examples of a first U-phase voltage instruction Vu1 which is a U-phase voltage instruction for the first inverter 11 in the second control mode, a second U-phase voltage instruction Vu2 which is a U-phase voltage instruction for the second inverter 12, and a carrier CA. The first U-phase voltage instruction Vu1 of FIG. 9 exemplifies a case in which the first inverter 11 is modulated using continuous PWM (CPWM). In addition, the first U-phase voltage instruction Vu1 of FIG. 10 exemplifies a case in which the first inverter 11 is modulated using discontinuous PWM (DPWM) (a mode exemplified with reference to tables 3 and 4.). The first U-phase voltage instruction Vu1 and the second U-phase voltage instruction Vu2 have phases differing by approximately 180 degrees from each other. In a case of identical modulation indices, when the vector of the current "Ia" and the vector of the voltage "V2" of the second inverter 12 lie on the same straight line (when the vectors are 180 degrees opposite in orientation), the power factor of the second inverter 12 is "1". As a result, by allowing the second inverter 12 to operate with high efficiency, system loss can be optimized.

Unlike the first control mode, instead of the second inverter 12 being in a short-circuited state, the first inverter 11 and the second inverter 12 effectively function, and thus, the maximum amplitude of U-phase voltage is "(4/3)E" which is twice that in the first control mode (see also the vector diagram of FIG. 2), and the maximum amplitude of phase-to-phase voltage is "2E". Note that the first direct-current power supply 61 and the second direct-current power supply 62 are independent of each other, and first direct-current voltage E1 of the first direct-current power supply 61 and second direct-current voltage E2 of the second direct-current power supply 62 may have different values. For example, to be precise, the maximum amplitude of U-phase voltage is "((2/3)E1)+(2/3)E2", but in this specification including also the following description, description is made assuming that "E1=E2=E".

Figure 11:
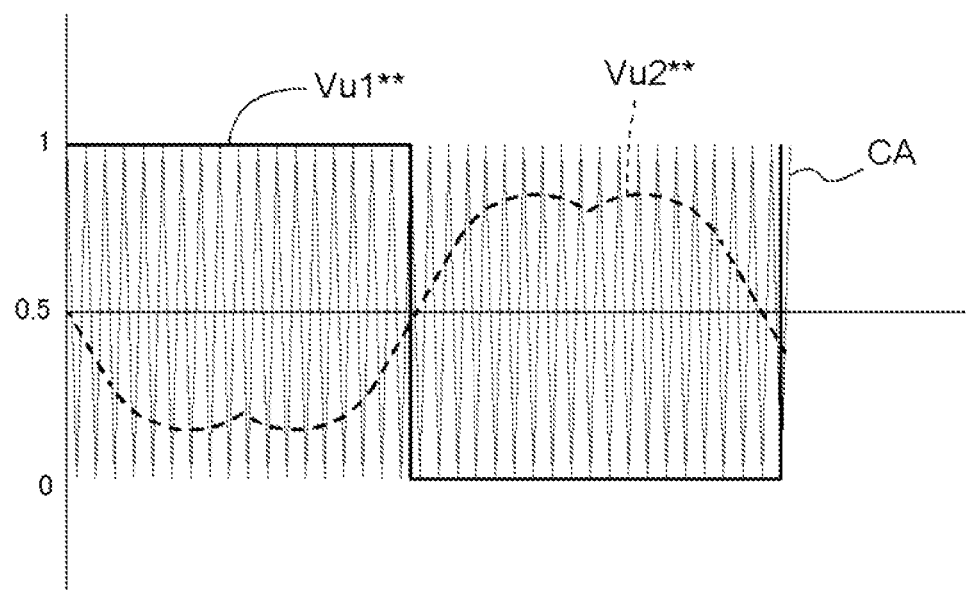
FIG. 11 is a waveform diagram showing an example of U-phase voltage instructions in the third control mode.
Figure 12:
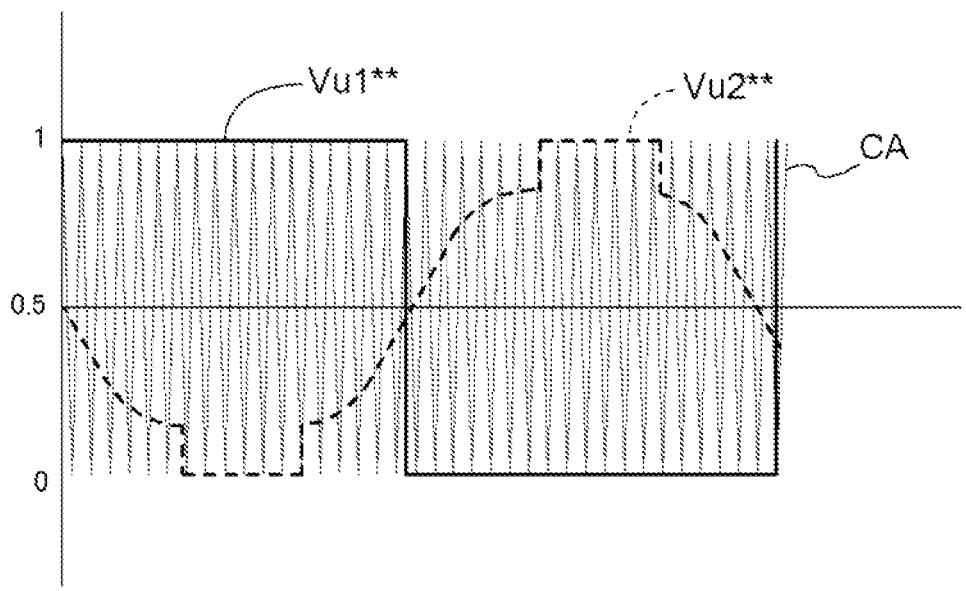
FIG. 12 is a waveform diagram showing another example of U-phase voltage instructions in the third control mode.

FIG. 6 exemplifies a vector diagram for one operating point in a d-q-axis vector coordinate system of the rotating electrical machine 80 whose drive is controlled in the third control mode. Waveform diagrams of FIGS. 11 and 12 show examples of a first U-phase voltage instruction Vu1 which is a U-phase voltage instruction for the first inverter 11 in the third control mode, a second U-phase voltage instruction Vu2 which is a U-phase voltage instruction for the second inverter 12, and a carrier CA. In the third control mode, since rectangular-wave control is performed on the first inverter 11, the first U-phase voltage instruction Vu1 also has a rectangular wave shape. FIG. 11 exemplifies that the second U-phase voltage instruction Vu2 has the same mode as the second control mode (a voltage instruction of continuous PWM (CPWM) such as space vector PWM (SVPWM)). In FIG. 12, as described above with reference to tables 3 and 4, the second U-phase voltage instruction Vu2** may be a voltage instruction of discontinuous PWM (DPWM). In addition, the second inverter 12 may be subjected to the same synchronous modulation as rectangular-wave modulation such as multi-pulse modulation (discontinuous PWM). Note that when both the first inverter 11 and the second inverter 12 are subjected to synchronous modulation, the carrier CA is not necessary.

In the third control mode, too, as in the second control mode, since the first inverter 11 and the second inverter 12 effectively function, the maximum amplitude of U-phase voltage is "(4/3)E", and the maximum amplitude of phase-to-phase voltage is "2E".

FIG. 7 exemplifies a vector diagram for one operating point in a d-q-axis vector coordinate system of the rotating electrical machine 80 whose drive is controlled in the fourth control mode. Here, the first inverter 11 and the second inverter 12 are controlled using rectangular waves whose phases differ by 180 degrees from each other, and a first voltage vector V1 of the first inverter 11 and a second voltage vector V2 of the second inverter 12 differ in vector orientation by 180 degrees from each other. Hence, as shown in FIG. 7, a combined voltage vector Va is a vector obtained by adding the magnitude of the second voltage vector V2 to the orientation of the first voltage vector V1.

Figure 13:
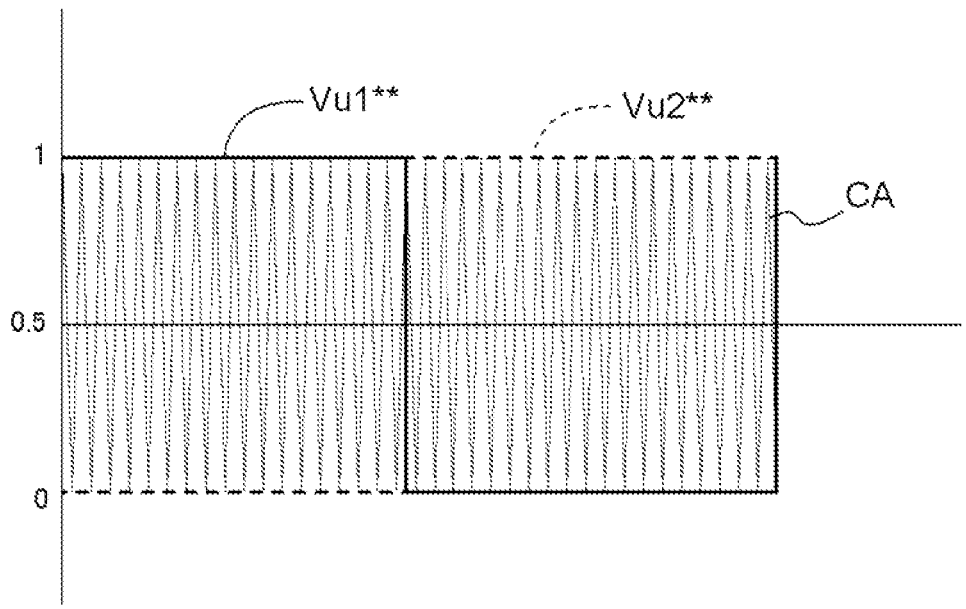
FIG. 13 is a waveform diagram showing an example of U-phase voltage instructions in the fourth control mode.

A waveform diagram of FIG. 13 shows an example of a first U-phase voltage instruction Vu1 which is a U-phase voltage instruction for the first inverter 11 in the fourth control mode, a second U-phase voltage instruction Vu2 which is a U-phase voltage instruction for the second inverter 12, and a carrier CA. In the fourth control mode, since rectangular-wave control is also performed on the second inverter 12 in addition to the first inverter 11, both the first U-phase voltage instruction Vu1 and the second U-phase voltage instruction Vu2 have a rectangular-wave shape. Note that when both the first inverter 11 and the second inverter 12 are subjected to rectangular-wave modulation (synchronous modulation), the carrier CA is not necessary, but for easy comparison of the modulation indices, etc. with the first control mode, the second control mode, and the third control mode, the carrier CA is also shown.

Figure 14:
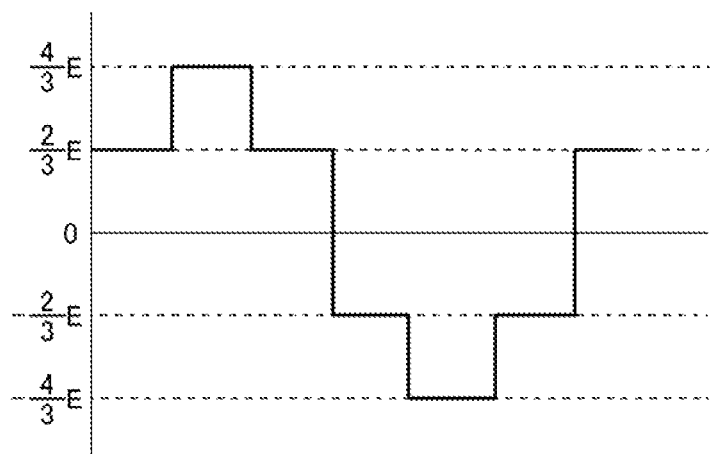
FIG. 14 is a waveform diagram showing an example of U-phase voltage in the fourth control mode.
Figure 15:
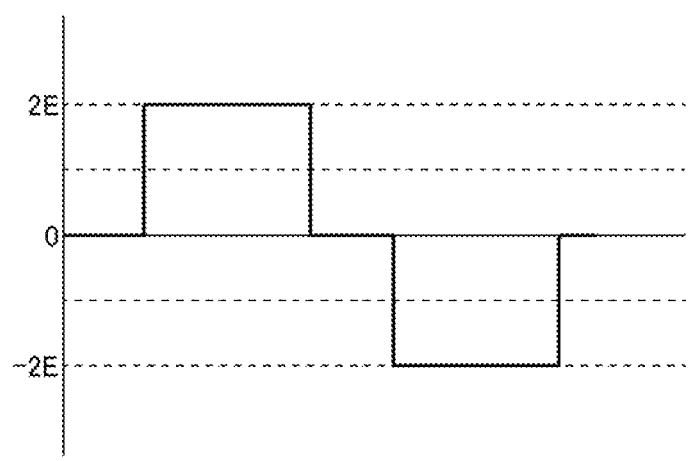
FIG. 15 is a waveform diagram showing an example of voltage between the U- and V-phases in the fourth control mode.

A waveform diagram of FIG. 14 shows an example of U-phase voltage in the fourth control mode, and a waveform diagram of FIG. 15 shows an example of voltage between the U- and V-phases in the fourth control mode. In the fourth control mode, too, since the first inverter 11 and the second inverter 12 effectively function, as shown in FIG. 14, the maximum amplitude of U-phase voltage is "(4/3)E". In addition, as shown in FIG. 15, the maximum amplitude of phase-to-phase voltage is "2E".

Note that the above description is made exemplifying a mode in which the first inverter 11 is connected to the first direct-current power supply 61 to convert electric power between direct current and multiphase alternating current, and the second inverter 12 is connected to the second direct-current power supply 62 which is independent of the first direct-current power supply 61 to convert electric power between direct current and multiphase alternating current. However, a mode may be adopted in which the first inverter 11 and the second inverter 12 that are connected to the same direct-current power supply 6 are controlled independently of each other.

Summary of the Embodiment

A summary of a rotating electrical machine control device (1) described above will be briefly described below.

In a rotating electrical machine control device (1) that controls drive of a rotating electrical machine (80) having multiphase open-end windings (8) which are independent of each other through a first inverter (11) and a second inverter (12), in one aspect, the first inverter (11) is connected to a one-end side of each of the multiphase open-end windings (8) to convert electric power between direct current and multiphase alternating current, the second inverter (12) is connected to an other-end side of each of the multiphase open-end windings (8) to convert electric power between direct current and multiphase alternating current, in the first inverter (11) and the second inverter (12), an arm (3A) for each alternating-current phase includes a series circuit of an upper-stage-side switching element (3H) and a lower-stage-side switching element (3L), the rotating electrical machine control device (1) has, as control schemes for the first inverter (11) and the second inverter (12), at least two control schemes among pulse width modulation control that outputs a plurality of pulses with different patterns in a single electrical angle cycle, active short-circuit control that brings the upper-stage-side switching elements (3H) of the arms (3A) for all of a plurality of phases into an on state or brings the lower-stage-side switching elements (3L) of the arms (3A) for all of the plurality of phases into an on state, and rectangular-wave control that outputs a single pulse in a single electrical angle cycle, the first inverter (11) and the second inverter (12) can be controlled by the control schemes that are independent of each other, one of the plurality of control schemes is a first control scheme and one of the plurality of control schemes different than the first control scheme is a second control scheme, and the rotating electrical machine control device (1) has a control mode in which the first inverter is controlled by the first control scheme and the second inverter is controlled by the second control scheme.

For control schemes for controlling the inverters (10), there are known various schemes appropriate to operating conditions such as the rotational speed and torque of the rotating electrical machine (80). When, as in the present configuration, two inverters (10) are provided, alternating-current voltage whose amplitude is larger than that of voltage on a direct-current side can be generated. Note, however, that the rotating electrical machine control device (1) does not need to control the two inverters (10) so as to always obtain the largest amplitude of alternating current, and may control the two inverters (10) so as to obtain as-needed amplitude. By controlling the first inverter (11) and the second inverter (12) by control schemes which are independent of each other, the two inverters (10) can be flexibly controlled based on the operating conditions of the rotating electrical machine (80). Furthermore, by having a control mode in which the first inverter (11) and the second inverter (12) are controlled by different control schemes, flexibility in control is increased, enabling to control drive of the rotating electrical machine (80) with high efficiency based on the operating conditions of the rotating electrical machine (80). Namely, according to the present configuration, the two inverters (10) provided at both ends of each open-end winding (8), respectively, can be appropriately controlled.

In one aspect, it is preferred that only either one of the first inverter (11) and the second inverter (12) be controlled using the pulse width modulation control, and the other be controlled using the active short-circuit control.

According to this configuration, by performing active short-circuit control on either one of the inverters (10), an operating mode in which the rotating electrical machine (80) is driven by one inverter (10) can be implemented.

In addition, in one aspect, it is preferred that the control schemes for the first inverter (11) and the second inverter (12) be set such that output from either one of the first inverter (11) and the second inverter (12) is greater than or equal to output from the other.

According to this configuration, each inverter (11, 12) can be appropriately constructed based on the operation of the two inverters (11, 12), e.g., an inverter (10) that is more likely to operate at relatively high output is constructed to have higher reliability, and an inverter (10) that is more likely to operate at relatively low output is constructed not to have excessive performance.

In addition, it is preferred that the control scheme for controlling the first inverter (11) and the control scheme for controlling the second inverter (12) be able to be changed independently of each other, and the rotating electrical machine control device (1) change each of the control schemes based on rotational speed of the rotating electrical machine (80).

The operating conditions of the rotating electrical machine (80) are often defined by a relationship between rotational speed and torque. By the rotating electrical machine control device (1) changing control schemes for controlling the first inverter (11) and the second inverter (12) based on rotational speed which is one parameter, drive of the rotating electrical machine (80) can be controlled with high efficiency based on the operating conditions of the rotating electrical machine (80).

Alternatively, when the control scheme for controlling the first inverter (11) and the control scheme for controlling the second inverter (12) can be changed independently of each other, it is preferred that the rotating electrical machine control device (1) change each of the control schemes based on a ratio of a root-mean-square value of three-phase alternating-current electric power to a root-mean-square value of direct-current electric power.

For example, when high output (high rotational speed or high torque) is required for the rotating electrical machine (80), a voltage-type inverter implements the requirement by increasing direct-current voltage or increasing a ratio at which direct-current voltage is converted into alternating-current voltage. When direct-current voltage is fixed, by increasing a ratio at which the direct-current voltage is converted into alternating-current voltage, the requirement can be implemented. This ratio can be represented as a ratio of a root-mean-square value of three-phase alternating-current electric power to a root-mean-square value of direct-current electric power (in a case of a voltage-type inverter, it is equivalent to a ratio of a root-mean-square value of three-phase alternating-current voltage to a root-mean-square value of direct-current voltage). Control schemes for controlling the inverters (10) include various schemes ranging from one in which the ratio is low to one in which the ratio is high. By changing control schemes based on a ratio of a root-mean-square value of three-phase alternating-current electric power to a root-mean-square value of direct-current electric power which is determined based on a requirement for the rotating electrical machine (80), drive of the rotating electrical machine (80) can be controlled with high efficiency based on the operating conditions of the rotating electrical machine (80).

When the control scheme for controlling the first inverter (11) and the control scheme for controlling the second inverter (12) can be changed independently of each other, in one aspect, it is preferred that when the control scheme for the first inverter (11) and the control scheme for the second inverter (12) are identical control schemes, the rotating electrical machine control device (1) change either one of the control schemes such that the control scheme for the first inverter (11) and the control scheme for the second inverter (12) are different control schemes, and when the control scheme for the first inverter (11) and the control scheme for the second inverter (12) are different control schemes, the rotating electrical machine control device (1) change either one of the control schemes such that the control scheme for the first inverter (11) and the control scheme for the second inverter (12) are another combination of different control schemes or identical control schemes.

When control schemes for the two inverters (11, 12) are simultaneously changed, it may become difficult to maintain continuity of control, which may affect the rotation of the rotating electrical machine (80). By changing a combination of control schemes for the two inverters (11, 12) by changing the control scheme for either one inverter (10) out of the two inverters (11, 12), the rotating electrical machine (80) can be stably controlled.

Here, it is preferred that the pulse width modulation control include continuous pulse width modulation and discontinuous pulse width modulation as the plurality of different control schemes, the continuous pulse width modulation include sinusoidal pulse width modulation and space vector pulse width modulation as the plurality of different control schemes, the discontinuous pulse width modulation include asynchronous modulation that outputs a pulse without being synchronized with rotation of the rotating electrical machine and synchronous modulation that outputs a pulse synchronized with rotation of the rotating electrical machine, as the plurality of different control schemes, and the synchronous modulation include multi-pulse modulation that outputs a plurality of pulses per electrical angle cycle of the rotating electrical machine.

For pulse width modulation control, there are various different schemes. By controlling the first inverter (11) and the second inverter (12) using pulse width modulation control of different schemes, respectively, the two inverters (10) can be flexibly controlled based on the operating conditions of the rotating electrical machine (80).

In addition, it is preferred that of the first inverter (11) and the second inverter (12), one inverter (10) that is controlled by pulses with a relatively low switching frequency when the pulse width modulation control is performed be constructed using first switching elements (31) whose switching loss upon a transition between an off state and an on state is relatively large, and the other inverter (10) that is controlled by pulses with a relatively high switching frequency when the pulse width modulation control is performed be constructed using second switching elements (32) whose switching loss is relatively small.

When one of the plurality of control schemes is a first control scheme and one control scheme different than the first control scheme is a second control scheme, and the first inverter (11) is controlled by the first control scheme and the second inverter (12) is controlled by the second control scheme, there may be a case in which, for example, the first inverter (11) is controlled using rectangular-wave control and the second inverter (12) is controlled using pulse width modulation control. When a pulse cycle of the rectangular-wave control is compared with a pulse cycle of the pulse width modulation control, pulses of the pulse width modulation control that outputs multiple pulses in a single electrical angle cycle have a short pulse cycle over pulses of the rectangular-wave control that outputs a one-cycle pulse in synchronization with a single electrical angle cycle, and the switching frequency is high. In this case, the switching frequency of the second inverter (12) is high compared to the switching frequency of the first inverter (11). In the reverse case, for example, when the first inverter (11) is controlled using pulse width modulation control and the second inverter (12) is controlled using rectangular-wave control, too, with the same way of thinking, the switching frequency of the first inverter (11) is high compared to the switching frequency of the second inverter (12).

When high output (high rotational speed or high torque) is required for the rotating electrical machine (80), there is a tendency that the switching frequency for pulse width modulation control also increases. As a matter of course, if the switching loss is the same, then the higher the switching frequency, the larger the total amount of loss. Since the first inverter (11) and the second inverter (12) are controlled independently of each other, their respective circuits can be constructed independently of each other. Therefore, it is preferred that an inverter (10) on a side whose switching frequency is likely to increase have a circuit configuration in which switching loss is relatively small. Namely, by constructing one of the inverters (10) that is controlled by pulses with a relatively high switching frequency when pulse width modulation control is performed, using the second switching elements (32) whose switching loss is relatively small compared to the first switching elements (31), loss can be reduced.

Here, it is preferred that the first switching elements (31) be Si-IGBTs or Si-MOSFETs, and the second switching elements (32) be SiC-MOSFETs, GaN-MOSFETs, or SiC-IGBTs.

For example, silicon carbide (SiC) is higher in dielectric breakdown field strength than silicon (Si), by which when a high-breakdown voltage power device is constructed, a drift layer with high impurity concentration and a thin film thickness can be formed. Since almost all resistive component of the high-breakdown voltage power device is the resistance of the drift layer, the on-resistance per unit area of a SiC device is low compared to a Si device. That is, the SiC device can reduce switching loss compared to the Si device. The same can also be said for a device using gallium nitride (GaN). Therefore, when the first switching elements (31) are Si devices, by using SiC devices or GaN devices as the second switching elements (32), an inverter (10) can be constructed using the second switching elements (32) with relatively small switching loss compared to the first switching elements (31).

REFERENCE SIGNS LIST

1: Rotating electrical machine control device, 3: Switching element, 3A: Arm, 3H: Upper-stage-side switching element, 3L: Lower-stage-side switching element, 8: Stator coil (open-end winding), 10: Inverter, 11: First inverter, 12: Second inverter, 31: First switching element, 32: Second switching element, and 80: Rotating electrical machine

The invention claimed is:

1. A rotating electrical machine control device that controls drive of a rotating electrical machine having multiphase open-end windings through a first inverter and a second inverter, the multiphase open-end windings being independent of each other, wherein
the first inverter is connected to a one-end side of each of the multiphase open-end windings to convert electric power between direct current and multiphase alternating current,
the second inverter is connected to an other-end side of each of the multiphase open-end windings to convert electric power between direct current and multiphase alternating current,
in the first inverter and the second inverter, an arm for each alternating-current phase includes a series circuit of an upper-stage-side switching element and a lower-stage-side switching element,
the rotating electrical machine control device has, as control schemes for the first inverter and the second inverter, at least two control schemes among pulse width modulation control that outputs a plurality of pulses with different patterns in a single electrical angle cycle, active short-circuit control that brings the upper-stage-side switching elements of the arms for all of a plurality of phases into an on state or brings the lower-stage-side switching elements of the arms for all of a plurality of phases into an on state, and rectangular-wave control that outputs a single pulse in a single electrical angle cycle,
the first inverter and the second inverter can be controlled by the control schemes that are independent of each other,
one of the plurality of control schemes is a first control scheme and one of the plurality of control schemes different than the first control scheme is a second control scheme, and
the rotating electrical machine control device has a plurality of control modes in which the first inverter is controlled by the first control scheme and the second inverter is controlled by the second control scheme,
wherein the plurality of control modes comprise a first control mode, a second control mode, a third control mode and a fourth control mode,
where under the first control mode the first control scheme is the pulse modulation control and the second control scheme is the active short-circuit control, under the second control mode the first control scheme is the pulse modulation control and the second control scheme is the pulse modulation control, under the third control mode the first control scheme is the rectangular-wave control and the second control scheme is the pulse modulation control, under the fourth control mode the first control scheme is the rectangular-wave control and the second control scheme is the rectangular-wave control.

2. The rotating electrical machine control device according to claim 1, wherein the control schemes for the first inverter and the second inverter are set such that output from either one of the first inverter and the second inverter is greater than or equal to output from another.

3. The rotating electrical machine control device according to claim 1, wherein the control schemes for the first inverter and the second inverter are set such that output from either one of the first inverter and the second inverter is greater than or equal to output from another.

4. The rotating electrical machine control device according to claim 1, wherein
the control scheme for controlling the first inverter and the control scheme for controlling the second inverter can be changed independently of each other, and
each of the control schemes is changed based on rotational speed of the rotating electrical machine.

5. The rotating electrical machine control device according to claim 1, wherein
the control scheme for controlling the first inverter and the control scheme for controlling the second inverter can be changed independently of each other, and
each of the control schemes is changed based on a ratio of a root-mean-square value of three-phase alternating-current electric power to a root-mean-square value of direct-current electric power.

6. The rotating electrical machine control device according to claim 1, wherein the pulse width modulation control includes continuous pulse width modulation and discontinuous pulse width modulation as the plurality of different control schemes, the continuous pulse width modulation includes sinusoidal pulse width modulation and space vector pulse width modulation as the plurality of different control schemes, the discontinuous pulse width modulation includes asynchronous modulation that outputs a pulse without being synchronized with rotation of the rotating electrical machine and synchronous modulation that outputs a pulse synchronized with rotation of the rotating electrical machine, as the plurality of different control schemes, and the synchronous modulation includes multi-pulse modulation that outputs a plurality of pulses per electrical angle cycle of the rotating electrical machine.

7. The rotating electrical machine control device according to claim 1, wherein of the first inverter and the second inverter, one inverter that is controlled by pulses with a relatively low switching frequency when the pulse width modulation control is performed is constructed using first switching elements whose switching loss upon a transition between an off state and an on state is relatively large, and another inverter that is controlled by pulses with a relatively high switching frequency when the pulse width modulation control is performed is constructed using second switching elements whose switching loss is relatively small.

8. The rotating electrical machine control device according to claim 1, wherein
the control scheme for controlling the first inverter and the control scheme for controlling the second inverter can be changed independently of each other, and
each of the control schemes is changed based on rotational speed of the rotating electrical machine.

9. The rotating electrical machine control device according to claim 2, wherein
the control scheme for controlling the first inverter and the control scheme for controlling the second inverter can be changed independently of each other, and
each of the control schemes is changed based on rotational speed of the rotating electrical machine.

10. The rotating electrical machine control device according to claim 2, wherein
the control scheme for controlling the first inverter and the control scheme for controlling the second inverter can be changed independently of each other, and
each of the control schemes is changed based on a ratio of a root-mean-square value of three-phase alternating-current electric power to a root-mean-square value of direct-current electric power.

11. The rotating electrical machine control device according to claim 5, wherein
when the control scheme for the first inverter and the control scheme for the second inverter are identical control schemes, either one of the control schemes is changed such that the control scheme for the first inverter and the control scheme for the second inverter are different control schemes, and
when the control scheme for the first inverter and the control scheme for the second inverter are different control schemes, either one of the control schemes is changed such that the control scheme for the first inverter and the control scheme for the second inverter are another combination of different control schemes or identical control schemes.

12. The rotating electrical machine control device according to claim 7, wherein the first switching elements are Si-IGBTs or Si-MOSFETs, and the second switching elements are SiC-MOSFETs, GaN-MOSFETs, or SiC-IGBTs.

13. The rotating electrical machine control device according to claim 9, wherein
when the control scheme for the first inverter and the control scheme for the second inverter are identical control schemes, either one of the control schemes is changed such that the control scheme for the first inverter and the control scheme for the second inverter are different control schemes, and
when the control scheme for the first inverter and the control scheme for the second inverter are different control schemes, either one of the control schemes is changed such that the control scheme for the first inverter and the control scheme for the second inverter are another combination of different control schemes or identical control schemes.

14. The rotating electrical machine control device according to claim 11, wherein the pulse width modulation control includes continuous pulse width modulation and discontinuous pulse width modulation as the plurality of different control schemes, the continuous pulse width modulation includes sinusoidal pulse width modulation and space vector pulse width modulation as the plurality of different control schemes, the discontinuous pulse width modulation includes asynchronous modulation that outputs a pulse without being synchronized with rotation of the rotating electrical machine and synchronous modulation that outputs a pulse synchronized with rotation of the rotating electrical machine, as the plurality of different control schemes, and the synchronous modulation includes multi-pulse modulation that outputs a plurality of pulses per electrical angle cycle of the rotating electrical machine.

15. The rotating electrical machine control device according to claim 13, wherein the pulse width modulation control includes continuous pulse width modulation and discontinuous pulse width modulation as the plurality of different control schemes, the continuous pulse width modulation includes sinusoidal pulse width modulation and space vector pulse width modulation as the plurality of different control schemes, the discontinuous pulse width modulation includes asynchronous modulation that outputs a pulse without being synchronized with rotation of the rotating electrical machine and synchronous modulation that outputs a pulse synchronized with rotation of the rotating electrical machine, as the plurality of different control schemes, and the synchronous modulation includes multi-pulse modulation that outputs a plurality of pulses per electrical angle cycle of the rotating electrical machine.

16. The rotating electrical machine control device according to claim 14, wherein of the first inverter and the second inverter, one inverter that is controlled by pulses with a relatively low switching frequency when the pulse width modulation control is performed is constructed using first switching elements whose switching loss upon a transition between an off state and an on state is relatively large, and another inverter that is controlled by pulses with a relatively high switching frequency when the pulse width modulation control is performed is constructed using second switching elements whose switching loss is relatively small.

17. The rotating electrical machine control device according to claim 15, wherein of the first inverter and the second inverter, one inverter that is controlled by pulses with a relatively low switching frequency when the pulse width modulation control is performed is constructed using first switching elements whose switching loss upon a transition between an off state and an on state is relatively large, and another inverter that is controlled by pulses with a relatively high switching frequency when the pulse width modulation control is performed is constructed using second switching elements whose switching loss is relatively small.

18. The rotating electrical machine control device according to claim 16, wherein the first switching elements are Si-IGBTs or Si-MOSFETs, and the second switching elements are SiC-MOSFETs, GaN-MOSFETs, or SiC-IGBTs.

19. The rotating electrical machine control device according to claim 17, wherein the first switching elements are Si-IGBTs or Si-MOSFETs, and the second switching elements are SiC-MOSFETs, GaN-MOSFETs, or SiC-IGBTs.

* * * * *